United States Patent
Katsuyama

(10) Patent No.: US 8,264,752 B2
(45) Date of Patent: Sep. 11, 2012

(54) IMAGE READING SYSTEM AND PROGRAM FOR READING ELECTRONIC PAPER, AND IMAGE FORMING APPARATUS INCLUDING THE IMAGE READING SYSTEM

(75) Inventor: Goro Katsuyama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 724 days.

(21) Appl. No.: 12/213,582

(22) Filed: Jun. 20, 2008

(65) Prior Publication Data

US 2009/0009829 A1    Jan. 8, 2009

(30) Foreign Application Priority Data

Jun. 20, 2007    (JP) ................................. 2007-162616

(51) Int. Cl.
*H04N 1/04* (2006.01)

(52) U.S. Cl. ..... 358/498; 358/1.12; 358/1.13; 358/1.15; 358/1.16

(58) Field of Classification Search .................. 358/1.15, 358/1.12, 1.13, 1.16

See application file for complete search history.

(56) References Cited

U.S. PATENT DOCUMENTS

| | | | |
|---|---|---|---|
| 6,304,739 B1 | 10/2001 | Katsuyama et al. |
| 6,507,720 B2 | 1/2003 | Kabumoto et al. |
| 6,519,436 B2 | 2/2003 | Katsuyama |
| 6,647,236 B2 | 11/2003 | Katsuyama |
| 6,690,901 B2 | 2/2004 | Katsuyama et al. |
| 6,771,921 B2 | 8/2004 | Katsuyama |
| 6,785,488 B2 | 8/2004 | Katsuyama |
| 6,848,685 B2 | 2/2005 | Katsuyama |
| 6,882,817 B2 | 4/2005 | Kita |
| 7,108,338 B2 | 9/2006 | Katsuyama et al. |
| 7,133,629 B2 | 11/2006 | Kita |
| 7,302,204 B2 | 11/2007 | Katsuyama et al. |
| 7,364,039 B2 | 4/2008 | Katsuyama |
| 2001/0033758 A1 | 10/2001 | Katsuyama |

(Continued)

FOREIGN PATENT DOCUMENTS

CN    1831593 A    9/2006

(Continued)

OTHER PUBLICATIONS

Japan Patent Application Publication 2005-012701, IDS, machine translation.*

(Continued)

*Primary Examiner* — Benny Q Tieu
*Assistant Examiner* — Qian Yang
(74) *Attorney, Agent, or Firm* — Harness, Dickey & Pierce, P.L.C.

(57) ABSTRACT

An image reading system includable in an image forming apparatus includes a document feed tray to contain original documents including either or both of a non-electronic recording medium and an electronic paper that includes a memory and a first communication element, a primary sensor to read the electronic data from the memory of each electronic paper before transfer of the original documents starts, a secondary sensor to sequentially detect the original documents during the transfer thereof and determine a media type of each original document, a transfer unit to transfer the non-electronic recording medium to a scanning position, a transfer controller to control the transfer unit based on the determination result of the secondary sensor, and an optical image reader to optically read an image formed on each non-electronic recording medium at the scanning position.

20 Claims, 15 Drawing Sheets

U.S. PATENT DOCUMENTS

| | | |
|---|---|---|
| 2002/0009310 A1 | 1/2002 | Kabumoto et al. |
| 2002/0150403 A1 | 10/2002 | Katsuyama et al. |
| 2002/0181973 A1 | 12/2002 | Katsuyama |
| 2002/0195915 A1 | 12/2002 | Katsuyama et al. |
| 2003/0052956 A1 | 3/2003 | Katsuyama |
| 2003/0170041 A1 | 9/2003 | Katsuyama |
| 2003/0215267 A1 | 11/2003 | Kita |
| 2004/0041785 A1 | 3/2004 | Stevens et al. |
| 2004/0071481 A1 | 4/2004 | Katsuyama |
| 2004/0114958 A1 | 6/2004 | Katsuyama et al. |
| 2004/0131390 A1 | 7/2004 | Kita |
| 2004/0190080 A1 | 9/2004 | Kodama et al. |
| 2005/0141004 A1 | 6/2005 | Kiwada |
| 2005/0211594 A1 | 9/2005 | Katsuyama |
| 2006/0023005 A1 | 2/2006 | Katsuyama et al. |
| 2006/0197724 A1 | 9/2006 | Sakai |
| 2006/0263116 A1 | 11/2006 | Katsuyama |
| 2007/0058178 A1 | 3/2007 | Kurihara et al. |
| 2007/0195378 A1 * | 8/2007 | Yoshida ................. 358/470 |

FOREIGN PATENT DOCUMENTS

| | | |
|---|---|---|
| JP | 2000-151925 | 5/2000 |
| JP | 2005-012701 | 1/2005 |
| JP | 2006-030560 | 2/2006 |
| JP | 2006-219164 | 8/2006 |
| JP | 2007-074333 | 3/2007 |
| JP | 2007-144674 | 6/2007 |
| WO | WO 2004/050373 | 6/2004 |

OTHER PUBLICATIONS

European Search Report dated Sep. 2, 2008 for corresponding European Application No. 08252133.7-1522.

European Search Report dated Oct. 12, 2009 for corresponding European Application No. 08252133.7-1522.

Bennett Daviss, "Paper goes electric", *New Scientist*), Issue 2186 (May 15, 1999).

Chinese Communication issued Apr. 29, 2010 for Chinese Application No. 2008101317121.

Japanese Office Action issued Oct. 28, 2010 for Japanese Application No. 2007-162616.

* cited by examiner

FIG. 14

DOCUMENT ORDER TABLE

| ORDER | MEDIA TYPE INFO. | ID INFO. | MEMORY INFO. |
|---|---|---|---|
| 1 | NON-ELECTRONIC | — | YES |
| 2 | ELECTRONIC | × × × × | YES |
| 3 | ELECTRONIC | ○○○○ | YES |
| 4 | NON-ELECTRONIC | — | YES |
| 5 | NON-ELECTRONIC | — | NO |
| ⋮ | ⋮ | ⋮ | ⋮ |

IMAGE READING SYSTEM AND PROGRAM FOR READING ELECTRONIC PAPER, AND IMAGE FORMING APPARATUS INCLUDING THE IMAGE READING SYSTEM

CROSS-REFERENCE TO RELATED APPLICATION

The present patent application claims priority under 35 U.S.C. §119 from Japanese Patent Application No. 2007-162616 filed on Jun. 20, 2007 in the Japan. Patent Office, the contents and disclosure of which are hereby incorporated by reference herein in their entirety.

BACKGROUND

1. Field

Example embodiments of the present patent application generally relate to an image reading system and program for effectively reading electronic paper, and an image forming apparatus including the image reading system. More particularly, the present patent application relates to an image reading system that can read electronic paper and a non-electronic paper, a program for effectively reading the electronic paper, and an image forming apparatus including the image reading system.

2. Discussion of the Related Art

Conventional image reading systems are designed to be capable of sheet-through-type operations, and include an image reading part that is fixed to a body thereof to transfer an original document at a given speed to the image reading part so as to obtain an image of the original document.

Such related-art image reading system is productive and cost-saving, and can accommodate multiple types of paper sheets, thin and thick.

Further, one known image reading system changes a document transfer speed depending on type or scanning magnification of multiple original documents such as paper sheets placed on a tray, so as to read the multiple original documents effectively.

Further still, electronic media or electronic paper, which combines favorable attributes of paper and of electronic display, have recently been developed. Such electronic paper includes, for example, an electronic display that displays images using electrophoresis. That is, the display uses tiny microcapsules filled with electrically (negatively or positively) charged white particles (i.e., titanium oxide) and charged black particles (i.e., carbon black) suspended in a clear liquid. These microcapsules are coated onto a surface of a base material. When an external charge or voltage is applied, the particles are forced to the front and back surfaces of the display, giving the picture an appropriate white or black appearance. Such electronic paper can be connected to a personal computer or PC via a universal serial bus or USB so that the PC can update electronic data of images to be displayed on the display and/or read out the electronic data stored in a memory of the display. In addition, a technique involving forming the display in polymer film has been studied.

However, related-art image reading systems have not been designed to conduct a mixed feeding operation involving both electronic paper(s) and paper sheet(s) in a single job.

Thus, there remains a need for further efforts to achieve the above-described operation and for improved image reading systems so as to read both electronic paper and paper sheet in a single job without reducing the speed of transfer and scan of original documents.

SUMMARY

In light of the foregoing, the inventors of the present patent application previously proposed to provide an image reading system that is fast in reading and cost-effective and can eliminate the above-described drawbacks, specifically, by increasing a scanning speed of original documents including electronic papers and non-electronic papers, sorting the original documents, and reducing costs, and an image forming apparatus including the image reading system.

One or more example embodiments of the present patent application have been made, taking the above-described circumstances into consideration.

An embodiment of the present patent application provides an image reading system that includes a document feed tray to contain original documents including either or both of a non-electronic recording medium and an electronic paper including a memory to store electronic data of the electronic paper and a first communication element to communicate with an external unit, a primary sensor that includes a second communication element to communicate with the first communication element of the electronic paper and that reads the electronic data from the memory of each electronic paper included in the original documents before transfer of the original documents starts, a secondary sensor that includes a third communication element to communicate with the first communication element of the electronic paper and that detects the original documents during the transfer thereof in an original order of the original documents set while contained in the document feed tray and determining whether each of the original documents is the non-electronic recording medium or the electronic paper, a transfer unit to transfer the non-electronic recording medium, based on a determination result obtained by the secondary sensor, to a scanning position disposed downstream from the document feed tray, a transfer controller to control the transfer unit based on the determination result obtained by the secondary sensor, an optical image reader to optically read an image formed on each non-electronic recording medium of the original documents at the scanning position to produce electronic data of the image formed on each non-electronic recording medium.

The above-described image reading system may further include a sorting unit to sort and rearrange the electronic data of the electronic paper read by the primary sensor in the original order. When the primary sensor reads complete electronic data of the electronic paper, including unique identification information provided to the electronic paper, and the secondary sensor detects the unique identification information stored in the storing unit of the electronic paper to determine that the detected original document is the electronic paper, the sorting unit may sort the electronic data of the electronic paper in the original order according to the unique identification information read by the primary sensor and the unique identification information read in the original order by the secondary sensor.

When the secondary sensor obtains no data of the unique identification information and determines that the detected original document is the non-electronic recording medium, the sorting unit may sort the electronic data of the non-electronic recording medium obtained by the optical image reader and the electronic data of the electronic paper obtained by the primary sensor in the original order, according to each media type of the original documents determined in the original order by the secondary sensor.

The secondary sensor may determine each media type of the original documents while the original documents travel between the document feed tray and the scanning position.

The above-described image reading system may further include a document discharge tray disposed downstream from the scanning position in a travel direction of the original documents. The document discharge tray may be configured to hold the original documents read at the scanning position, and the transfer controller may control the original documents traveling in the transfer unit, based on the determination result obtained by the secondary sensor, to transfer the electronic paper to the document discharge tray faster than the non-electronic recording medium.

The above-described image reading system may further include a storage unit to store the electronic data of the non-electronic recording medium and the electronic data of the electronic paper in a common format.

At least one embodiment of the present patent application provides an image reading system that includes a document feed tray to contain original documents including either or both of a non-electronic recording medium and an electronic paper that includes a memory to store electronic data of the electronic paper and a first communication element to communicate with an external unit, a primary sensor including a second communication element to communicate with the first communication element of the electronic paper, and reading the electronic data from the memory of each electronic paper included in the original documents before each electronic paper is transferred from the document feed tray, a secondary sensor to detect the original documents during transfer in an original order as set in the document feed tray and determine whether each of the original documents is the non-electronic recording medium or the electronic paper, a transfer unit to transfer the original documents to a scanning position disposed downstream from the document feed tray, an optical image reader to optically read an image formed on each of the original documents at the scanning position to obtain electronic data of the image of each of the original documents.

The above-described image reading system may further include a sorting unit to sort the electronic data of the electronic paper read by the primary sensor in the original order. When the primary sensor reads complete electronic data of the electronic paper, including unique identification information provided to the electronic-paper, and the secondary sensor determines that the detected original document is the electronic paper, the optical image reader may reads an image of unique identification information provided to each electronic paper to obtain the electronic data of the image, and the sorting unit may sort the electronic data of the electronic paper in the original order according to the electronic data of the unique identification information read by the primary sensor and the electronic data of the unique identification information read by the optical image reader.

At least one embodiment of the present patent application provides an image forming apparatus that includes either one or both of the above-described image reading systems, and an image forming mechanism that prints on a recording medium an image according to the electronic data obtained either by the primary sensor or at the scanning position.

BRIEF DESCRIPTION OF THE DRAWINGS

The accompanying drawings are intended to depict example embodiments of the present patent application and should not be interpreted to limit the scope thereof. The accompanying drawings are not to be considered as drawn to scale unless explicitly noted.

A more complete appreciation of the disclosure and many of the attendant advantages thereof will be readily obtained as the same becomes better understood by reference to the following detailed description when considered in connection with the accompanying drawings, wherein:

FIG. 14 is a document order table for performing the operations in the image reading system according to an example embodiment of the present patent application;

DETAILED DESCRIPTION OF EXAMPLE EMBODIMENTS

Figure 1:
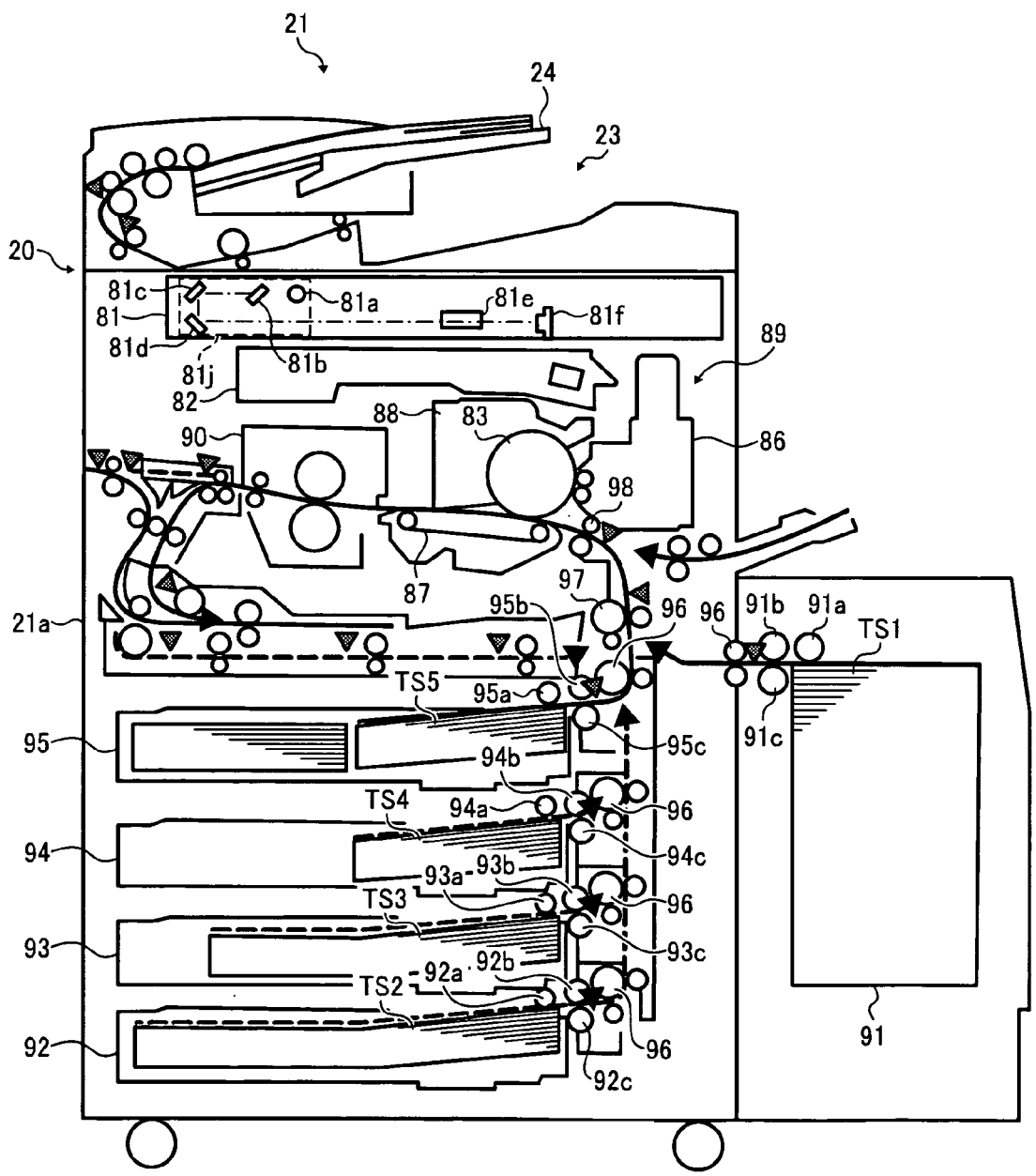
FIG. 1 is a cross-sectional view of a schematic configuration of an image forming apparatus including an image reading system according to an example embodiment of the present patent application.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present patent application.

The terminology used herein is for the purpose of describing particular embodiments only and is not intended to be limiting of the present patent application. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present patent application are described.

Now, example embodiments of the present patent application are described in detail below with reference to the accompanying drawings.

Descriptions are given, with reference to the accompanying drawings, of examples, example embodiments, modification of example embodiments, etc., of an image reading system according to the present patent application, and an image forming apparatus, according to the present patent application, including the image reading system. Elements having the same functions and shapes are denoted by the same reference numerals throughout the specification and redundant descriptions are omitted. Elements that do not require descriptions may be omitted from the drawings as a matter of convenience. Reference numerals of elements extracted from the patent publications are in parentheses so as to be distinguished from those of example embodiments of the present patent application.

The present patent application includes a technique applicable to any image reading system, and an image forming apparatus including the image reading system. For example, the technique of the present patent application is implemented in the most effective manner in an image reading system, and an electrophotographic image forming apparatus including the image reading system. The technique of the present patent application is further implemented in the most effective manner in an electronic paper used in the image reading system, and a program used in the image reading system.

FIGS. 1 through 14 show an image reading system, according to an example embodiment of the present patent application, an image forming apparatus, according to an example embodiment of the present patent application, including the image reading system, an electronic paper, according to an example embodiment of the present patent application, used in the image reading system, and a program, according to an example embodiment of the present patent application, used in the image reading system.

In an example embodiment, an image forming apparatus corresponds to a copier 21, and the image reading system corresponds to an image reading system 20, which is a combination of an automatic document feeder or ADF 23 and an image reader or scanner 81.

Instead of the copier 21, the image forming apparatus can include a facsimile machine, printer, and multiple image forming apparatus including at least two functions of copier, facsimile machine, and the like. In addition, instead of a combination of the ADF 23 and the scanner 81, the image reading system 20 can include a single scanner, facsimile machine, and multiple image forming apparatus having at least two functions of copier, facsimile machine, and the like.

In FIG. 1, the copier 21 includes a copier main body 21a that includes a contact glass 22a (see FIG. 2), a slit glass 22b (see FIG. 2), and various image forming units and components of the copier 21 so as to form an image on a recording medium.

The contact glass 22a includes a translucent member, and is mounted on the top of the copier main body 21a.

The slit glass 22b, which includes a scanning position 80, is also mounted on the top of the copier main body 21a and next to the contact glass 22a. The slit glass 22b also includes a translucent member and has a smaller area than the contact glass 22a.

Above the copier main body 21a, the ADF 23 is mounted. The ADF 23 is hinged or attached via an openably closable hinging mechanism, not shown, to the copier main body 21a so that the contact glass 22a can be selectively covered or uncovered.

The copier 21 includes other various image forming components and parts, such as the scanner 81, which will be described later. The scanner 81 and the ADF 23 form an image reading system 20 to feed and transfer original documents, including electronic media and non-electronic media (i.e., paper sheets) to be read effectively.

Next, details of a configuration of the ADF 23 and operations performed by the ADF 23 and the scanner 81 forming the image reading system 20 are described, in reference to FIGS. 2 through 6.

Figure 2:
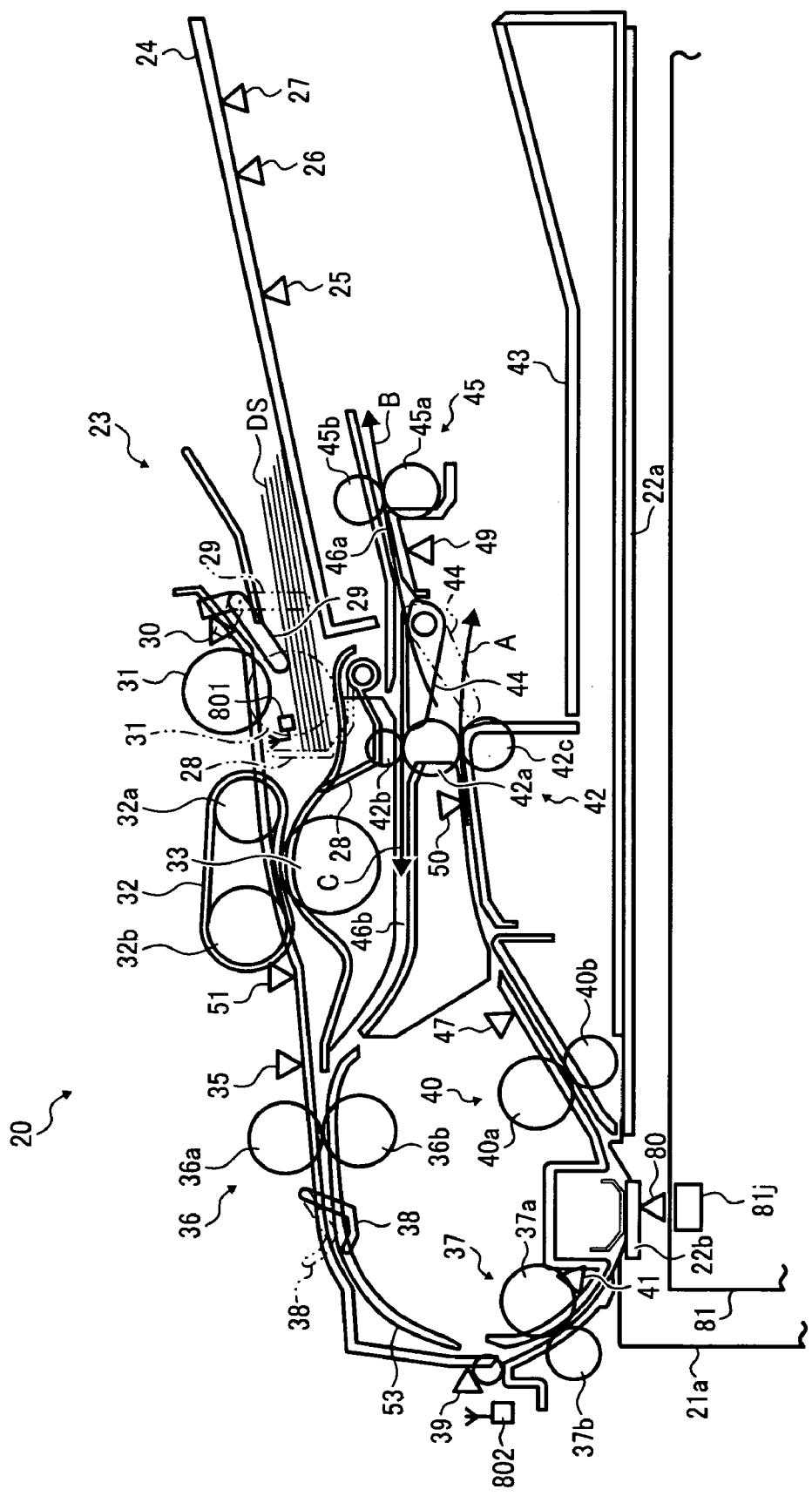
FIG. 2 is a cross-sectional view of a schematic configuration of the image reading system of FIG. 1, including an automatic document feeder and an image reader, according to an example embodiment of the present patent application.
Figure 3:
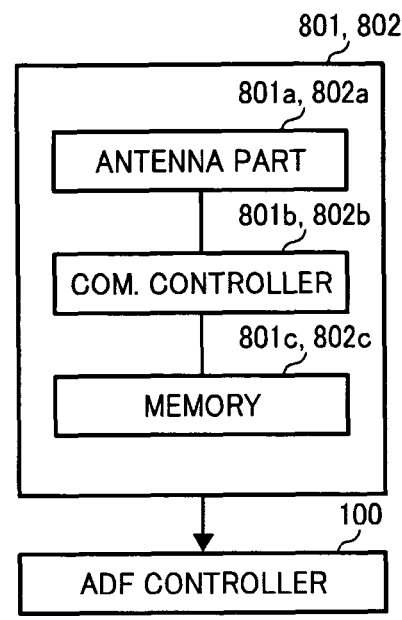
FIG. 3 is a block diagram of a communication image reader according to an example embodiment of the present patent application.
Figure 4:
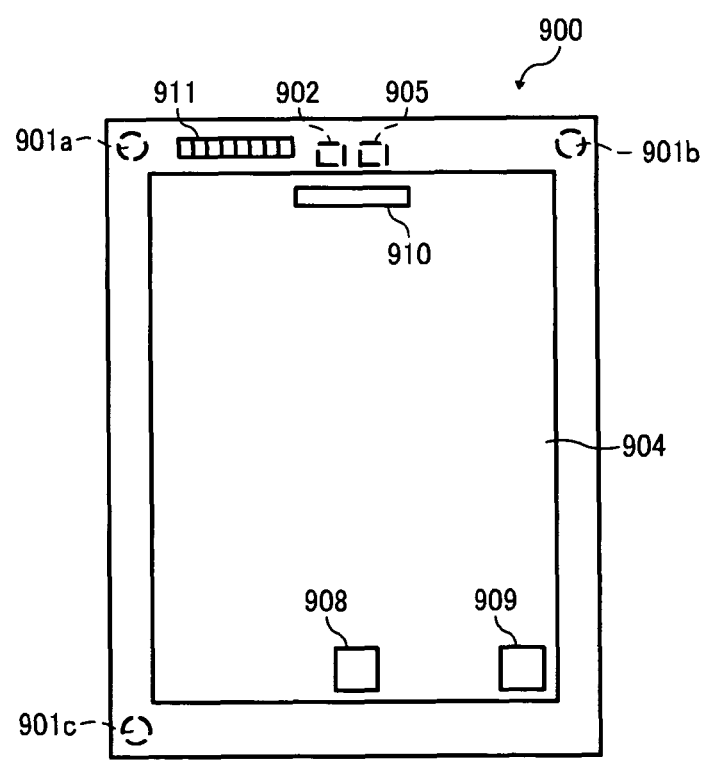
FIG. 4 is a plan view of a surface of an electronic paper fed in the image reading system of FIG. 1, according to an example embodiment of the present patent application.
Figure 5:
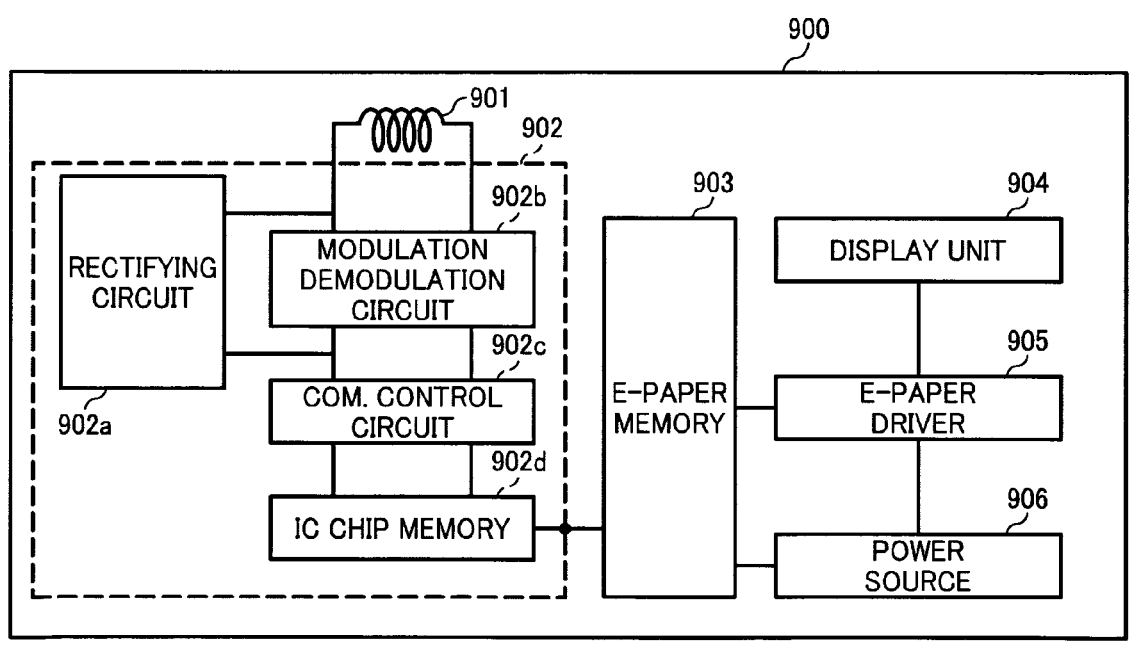
FIG. 5 is a block diagram of the electronic paper of FIG. 4, according to an example embodiment of the present patent application.
Figure 6:
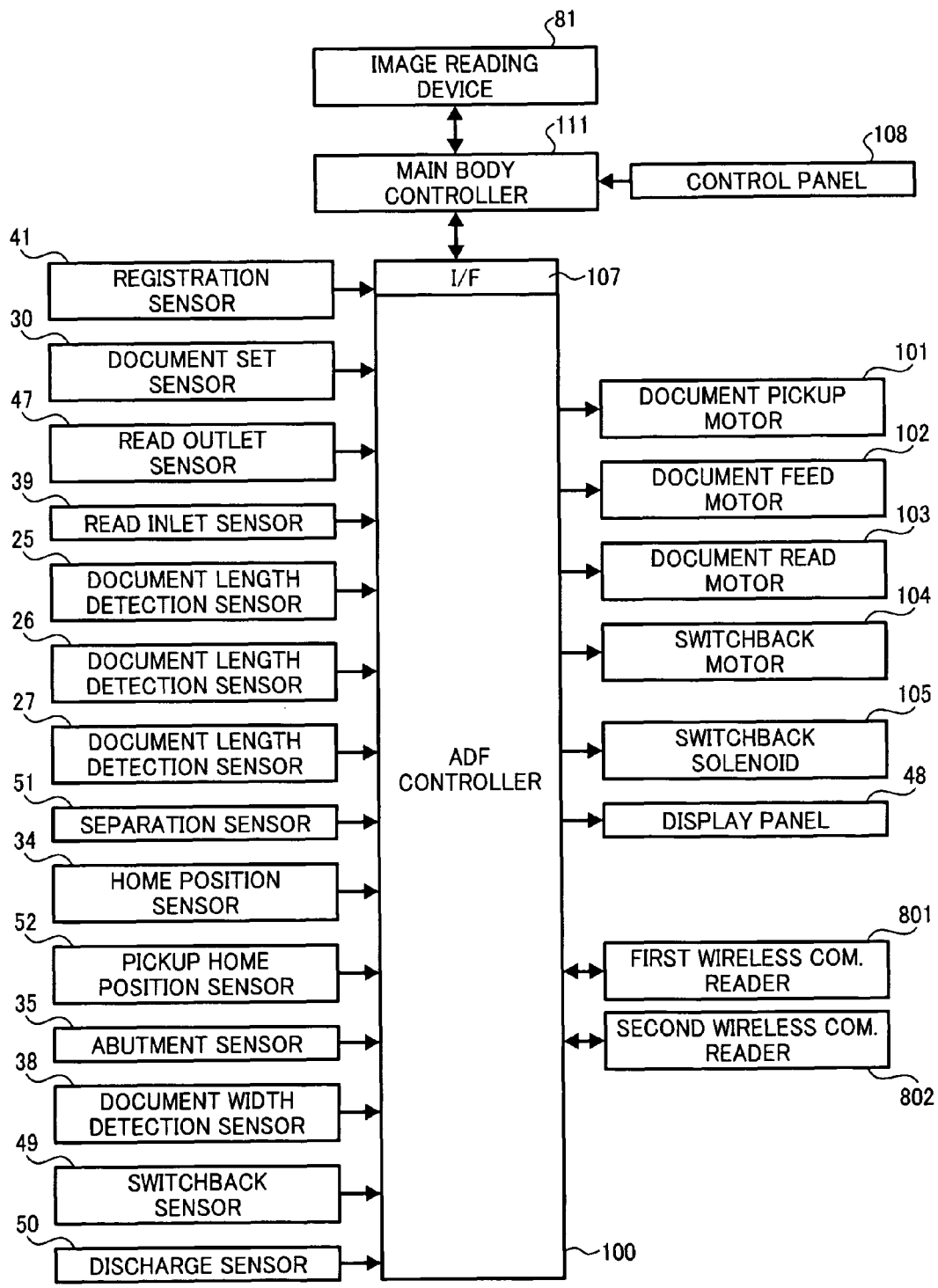
FIG. 6 is a block diagram of a control system of the image reading system of FIG. 1, according to an example embodiment of the present patent application.

FIG. 2 is a schematic configuration of the image reading system 20 including the ADF 23 connected to the scanner 81 provided in the copier main body 21a. FIG. 3 is a block diagram of a first wireless reader 801 and a second wireless reader 802. FIG. 4 is a plan view showing a schematic configuration of an electronic paper 900. FIG. 5 is a block diagram of the electronic paper 900. FIG. 6 is a block diagram of the image reading system 20, focusing on an ADF controller 100 of the ADF 23 according to an example embodiment of the present patent application.

In FIG. 2, the ADF 23 partly serves as a transfer unit and includes a document setting table 24 that serves as a document feed tray. On the document setting table 24, an original document stack DS that is a stack of original documents are placed in a face-up manner. The original document stack DS includes paper sheets serving as non-electronic recording medium or electronic papers or both.

In the ADF 23, document length detection sensors 25, 26, and 27 are mounted on a table part of the document setting table 24. The document length detection sensors 25, 25, and 27 serve as document length detecting member. Each of the length detection sensors 25, 25, and 27 includes a combination of a light receiving element and a light emitting element. The length detection sensors 25, 26, and 27 are disposed on the document setting table 24 so as to determine at least an orientation (i.e., portrait or landscape) of the same size of the original documents.

The ADF controller 100 (see FIG. 3) determines the length of the original document stack DS in a document travel direction of the original document stack DS accumulated on the document setting table 24, based on information input from the light receiving elements of the length detection sensors 25, 26, and 27.

A document stopper 28 is disposed at a downstream side of the document setting table 24 in the document travel direction. The document stopper 28 serves as a stopping member to move between an abutment position that is indicated by a chain double-dashed line in FIG. 2 and a home position that is indicated by a solid line in FIG. 2. A document pickup motor 101 (see FIG. 6) may cause the document stopper 28 to move to the abutment position when aligning the leading edge of the original document stack DS and to move to the home position when retreating therefrom.

In addition, by abutting the original document stack DS to side fences, not shown, mounted on the document setting table 24, the width direction of the original document stack DS can be positioned in a direction perpendicular to the document travel direction of each original document.

When the document stopper 28 moves in a downward direction toward the home position, a home position sensor 34 (see FIG. 6) may detect the movement of the document stopper 28 and output the detection result to the ADF controller 100.

On the original document setting table 24 at a side of the leading edge of the original document stack DS, a document set filler 29 and a document set sensor 30.

When the original document stack DS is mounted on the document setting table 24, the leading edge of the original document stack DS pushes the document set filler 29, therefore, the document set filler 29 may move from a position that is indicated by a chain double-dashed line in FIG. 2 to a position that is indicated by a solid line in FIG. 2. When the document set filler 29 changes its position from the undetected state of the original document stack DS to the detected state of the original document stack DS, the document set sensor 30 may output a signal to the ADF controller 100.

The ADF controller 100 is connected to a main body controller 111 via an interface or I/F 107 and outputs the signal to the I/F 107. The main body controller 111 is mounted on the copier main body 21a of the copier 21.

Based on the input signal, the main body controller 111 may shift to a standby condition for reading original documents in the copier main body 21a by the scanner 81.

Above the document stopper 28, a document pickup roller 31 that serves as a document pickup member is disposed. The document pickup roller 31 may transmit the driving force from the document pickup motor 101 via a document pickup cam 126. The document pickup motor 101 and the document pickup cam 126 may cause the document pickup roller 31 to move in a vertical direction between a home position that is indicated by a solid line in FIG. 2 to retreat from the original document stack DS and a contact position that is indicated by a chain double-dashed line in FIG. 2 to contact with the top of the original document stack DS.

When the document pickup roller 31 moves in an upward direction toward its home position, a pickup roller home position sensor 52 (see FIG. 6) may detect the movement of the document pickup roller 31 and output the detection result to the ADF controller 100.

The first wireless reader 801 serves as a primary sensor and is disposed in the vicinity of the document pickup roller 21 and at a downstream side therefrom in the document travel direction along a document transfer path.

As shown in FIG. 3, the first wireless communication reader 801 includes an antenna part 801a, a communication controller 801b, and a memory 801c.

The antenna part 801a includes a coil antenna, for example, to generate a magnetic field on the electronic paper 900, cause electromagnetic coupling, and supplies electromotive force. The first wireless communication reader 801 also transmits a given signal to the electronic paper 900.

The communication controller 801b includes circuits such as a modulation and demodulation circuit 902b (see FIG. 5) and a communication control circuit 902c (see FIG. 5), which will be described later. The communication controller 801b uses a method such as ASK (amplitude shift keying), FSK (frequency shift keying), and PSK (pulse shift keying) to modulate signals (e.g., a signal starting software included in the electronic paper 900, a signal requesting identification data such as ID number provided to each electronic paper), and send the signals to the electronic paper 900. At the same time, the communication controller 801b receives signals (e.g., a signal indicating the ID number, a signal indicating electronic data stored by page of the electronic paper 900) from the electronic paper 900 to demodulate the signals.

The memory 801c stores data obtained by demodulation of the signals indicating the ID number and the electronic data that are sent from the electronic paper 900. The data is transmitted to the ADF controller 100. The ADF controller 100 can determine based on the ID number that an original document traveling the ADF 23 is the electronic paper 900. The ADF controller 100 can also cause the memory 801c and/or a memory in the main body controller 111 to store the ID number of the traveling electronic paper 900 responsive to electronic data of the whole pages of the traveling electronic paper 900. Further, the ADF controller 100 can transmit the electronic data via a communication unit, not shown.

To meet collision avoidance of communication of the electronic paper 900, the communication controller 801b further includes software for collision avoidance of communication by a given anti-collision method (for example, a slotted ALOHA method). In an example embodiment of the present patent application, when multiple electronic papers are loaded on the document setting table 24, the first wireless reader 801 scans electronic data of the multiple electronic papers in a lump and stores the electronic data by each ID number in the memory 801c. Accordingly, such software is needed.

The second wireless reader 802 serves as a secondary sensor and is disposed in the vicinity of a read inlet sensor 39.

A detailed description of the second wireless communication reader 802 is omitted since the configuration thereof is substantially same as the first wireless reader 801. Briefly, the second wireless reader 802 determines a media type of the original document according to an ID number, in other words, whether the conveyed original document includes an ID number to respond to the second wireless reader 802 or not. Further, the second wireless reader 802 determines the order of the electronic papers, which corresponds to the order of the original documents stacked on the document setting table 24, and the order to transfer from the document setting table 24 according to the ID number. Therefore, the second wireless reader 802 does not include a configuration to obtain and store electronic data of the whole pages, but may include identical configuration and functions to serve as a backup unit of the first wireless reader 801.

As shown in FIG. 4, the electronic paper 900 includes a display surface or a screen of a display part 904 on one side thereof. The display unit 904 includes, for example, a liquid crystal display using polymer film or PFLCD that can change its shape, thereby transferring the electronic paper 900 as a paper sheet. A first display region 908 on the display surface displays page data such as a currently displayed page number of total pages or the last page, a second display region 909 displays volume data such as a current volume of total volumes, and the third display region 910 displays the immediately preceding ID number. Further, the electronic paper 900 is provided with a page button, not shown, formed around the edges of the display surface of the display part 904 for and directing a page switching operation or a display updating operation to switch or change an image displayed on the display part 904 according to this instruction. The above-described ID number may be printed as a number or bar code around the edges of the display surface of the display part 904 so as to be read optically or magnetically.

As shown in FIG. 5, the electronic paper 900 includes an antenna coil 901, which corresponds to antenna coils 901a, 901b, and 901c, an integrated circuit chip or IC chip 902, an electronic paper memory 903, a display part 904, an electronic paper driver 905, a power source 906, the first display region 908, and the second display region 909.

The antenna coil 901 is connected to the IC chip 902 that includes input and output terminals.

The electronic paper memory 903 includes rewritable, non-volatile memory element such as electronically erasable and programmable read-only memory or EEPROM.

The display part 904 corresponds to a microcapsule-type electrophoretic display, for example.

The electronic paper driver 905 serves as a display unit and converts data or electronic data (ID number data, electronic data per page, etc.) stored in an IC chip memory 902d (see below) into display data.

The power source 906 corresponds to solar battery or button battery.

Further, the IC chip 902 includes a rectifying circuit 902a, a modulating and demodulating circuit 902b, a communication control circuit 902c, and the IC chip memory 902d.

The rectifying circuit 902a rectifies voltage generated by electromagnetic induction with a reader, for example, the first wireless reader 801 or the second wireless reader 802 or both.

The modulation and demodulation circuit 902b demodulate the signal received via the antenna coil 901 and modulate the signal to be transmitted via the antenna coil 901.

The communication control circuit 902c is connected to the IC chip memory 902d.

The IC chip memory 902d stores various data (for example, the ID number data, the electronic data per page, volume data indicating a volume of the electronic data, page data or information) and software (for example, a communication program including the given anti-collision method).

The antenna coils 901a, 901b, and 901c are disposed at respective corners so as to constantly detect the leading edge of an original document, regardless of a direction of setting the original document.

The display part 904 switchingly displays images per page. The IC chip memory 902d stores image information per page that corresponds to the electronic data, page information that corresponds to the page data, volume information that corresponds to the volume data, identification information of each electronic paper that corresponds to the ID number such as a serial number, the previously described communication program, etc. The image includes text, drawing, picture, and so forth. The communication control circuit 902c controls transmission of one or both of the signal indicating the ID number data and the signal indicating the electronic data of the whole pages of the electronic paper according to signals from the first wireless reader 801 and the second wireless reader 802.

With the above-described configuration, when the reader such as the first wireless reader 801 and the second wireless reader 802 comes close to the electronic paper 900, an antenna coil included in the reader generates magnetic field, which causes electromagnetic induction to the antenna coil of the reader and the antenna coil 901 of the electronic paper 900. The electromagnetic induction causes induced electromotive force in the antenna coil 901 to flow to the rectifying circuit 902a. The electric power rectified by the rectifying circuit 902a is supplied to the IC chip 902 to be used for the start of the communication program and the information update.

Next, details of a reading operation performed by the ADF 23 and the scanner 81 forming the image reading system 20 are described, in reference to FIGS. 1 and 2 again.

The main body 21a includes a control panel 108 (see FIG. 6). When a print key that is displayed on the control panel 108 mounted on the copier main body 21a is pressed, the main body controller 111 may transmit a document pickup signal via the I/F 107 to the ADF controller 100. After receiving the document pickup signal, the ADF controller 100 may drive the document pickup motor 101 to rotate in a normal direction so as to cause the document stopper 28 to retreat from the original document stack DS to move in a downward direction.

When the document stopper 28 moves to the home position, the home position sensor 34 may detect the movement of the document stopper 28, and the ADF controller 100 may drive the document pickup motor 101 in a reverse direction so as to cause the document pickup roller 31 to move down to a position to contact with the original document stack DS.

When the electronic paper 900 is included in the original document stack DS and moves closer to the first wireless reader 801, the antenna part 801a of the first wireless reader 801 and the antenna coil 901 of the electronic paper 900 may be electromagnetically coupled to cause induced electromotive force to be supplied to the IC chip 902 so that the communication program may be started. The first wireless reader 801 communicates with the electronic paper 900 to obtain the ID data and the electronic data for the whole pages of the original document, and sends the obtained data to the ADF controller 100. When two or more electronic papers 900 are loaded in the original document stack DS, ID numbers and electronic data for the whole pages of the multiple electronic papers 900 at one time in a batch.

After the communication scanning of the first wireless reader 801 completes, a document feed motor 102 (see FIG. 6) may rotate in a normal direction, which may cause the document pickup roller 31 to start feeding original documents, desirably one document sheet, from the original document stack DS accumulated on the document setting table 24. The fed original document may be transferred to a document feeding belt 32 and a reverse roller 33 both disposed at the downstream side of the document pickup roller 31 in the document travel direction. The document feeding belt 32 and the reverse roller 33 may form a separation and transfer mechanism together with some other components.

The document feeding belt 32 shown in FIG. 2 is extended by and spanned around a drive roller 32a and a driven roller 32b. When the driving force of the document feed motor 102 is transmitted to the drive roller 32a, the document feeding belt 32 in a shape of an endless loop may rotate.

When the document feed motor 102 is rotated in a normal direction, the document feeding belt 32 may rotate to move an original document in the document travel direction, which is a rotation in a clockwise direction in FIG. 2.

The reverse roller 33 also serves as a document separation and feed unit, and includes a torque limiter, not shown. When the document feed motor 102 is rotated in a normal direction, the reverse roller 33 may be rotated in a direction opposite to the document travel direction, which is a rotation in a counterclockwise direction in FIG. 2.

With the above-described operations, an original document placed on the top of the original document stack DS and a next original document placed immediately below the top original document may be separated and only the top original document may be fed.

Specifically, the reverse roller 33 may be held in contact with the document feeding belt 32 with a sufficient pressure. When being held in contact with the document feeding belt 32 directly or via one original document, the reverse roller 33 may rotate with the document feeding belt 32 in a counterclockwise direction. When two or more original documents enter between the document feeding belt 32 and the reverse roller 33, the force of the reverse roller 33 rotating with the document feeding belt 32 may be set to a value smaller than the torque of the torque limiter. Accordingly, the reverse roller 33 can rotate in a clockwise direction to push back extra original document(s), so as to reduce or prevent a chance of multi-feeding of original documents. Thus, the document feeding belt 32 and the reverse roller 33 separate an original document placed on top of the original document stack DS and feed the original document to be scanned.

The separately fed original document may be detected by a separation sensor 51 disposed downstream from the document feeding belt 32. The separation sensor 51 may serve as a separated document detection unit. The original document detected by the separation sensor 51 may be further transferred by the document feeding belt 32. When the original document proceeds by a reference amount of X mm after the leading edge of the original document is detected by an abutment sensor 35 that is disposed downstream from the document feeding belt 32, the ADF controller 100 may stop the rotation of the document feed motor 102 in the normal direction.

The reference amount of X mm is set to a distance that is greater than the distance between the abutment sensor 35 and a nip contact of a pair of pull-out rollers 36 that serves as a rotation unit. That is, the original document transferred thereto may be stopped while being bowed in a constant manner with the leading edge thereof abut against the nip contact formed between a pull-out drive roller 36a and a pull-out driven roller 36b that are in sliding contact with each other.

At this time, according to the instructions from the ADF controller 100, the document pickup motor 101 rotates in a normal direction to retreat the document pickup roller 31 from the top surface of the original document and transfer the original document by the transfer force of the document feeding belt 32 only. By so doing, the leading edge of the original document abuts against the nip contact formed between the pull-out drive roller 36a and the pull-out driven roller 36b of the pair of pull-out rollers 36, thereby correcting the skew of the original document occurred when separated from the original document stack DS.

Further, after the skew of the original document is corrected by the reverse rotation of the document feed motor 102, the pull-out drive roller 36a and the pull-out driven roller 36b may transfer the original document toward a pair of read inlet rollers 37 disposed at the downstream side of the document transfer path via a reverse path 53. The pair of read inlet rollers 37 shown in FIG. 2 serves as a document conveyance unit, and includes a read inlet drive roller 37a and a read inlet driven roller 37b.

When the document feed motor 102 rotates in a reverse direction, the pull-out drive roller 36a may be rotated, however, the driving force thereof may not be transmitted to the document pickup roller 31 and the document feeding belt 32 because of the function of a later described one-way clutch.

Further, multiple document width detection sensors 38 are arranged downstream from the pull-out drive roller 36a and the pull-out driven roller 36b. The multiple document width detection sensors 38 are disposed or aligned in a direction perpendicular to the sheet travel direction of FIG. 2, so as to move between a position that is indicated by the solid line in FIG. 2 and a position that is indicated by the chain double-dashed line in FIG. 2.

When an original document is detected, the multiple document width detection sensors 38 may move to the position that is indicated by the chain double-dashed line. The document width detection sensors 38 may then obtain information of the width direction that runs perpendicular to the document travel direction of the original document transferred by the pull-out drive roller 36a and the pull-out driven roller 36b, and transmit the detection results to the ADF controller 100.

The ADF controller 100 may transmit, to the main body controller 111, information of the size of the original document stack DS accumulated on the document setting table 24, based on the detection results of the length of the original document obtained by the document length detection sensors 25, 26, and 27 and the detection results of the width of the original document obtained by the document width detection sensors 38.

Further, the ADF controller 100 may count the number of motor drive pulses that corresponds to a distance of the original document transferred while the abutment sensor 35 is detecting the leading edge and trailing edge of the original document. By counting the number of motor drive pulses, the correct length of an original document may be calculated.

Further, when the original document is transferred to the pair of read inlet rollers 37 according to rotation of the pull-out drive roller 36a, the transfer speed of the original document may be set to high speed to reduce a time period to transfer the original document to the scanning position 80 provided on the slit glass 22b. Specially, from a second original document and after, the high speed document transfer can reduce a distance between two sequentially processed original documents. This can enhance the productivity in conveyance or transfer of the original documents. When a read inlet sensor 39 detects the leading edge of the original document, the transfer speed may be decreased before the leading edge of the original document enters between the pair of read inlet rollers 37. Further, the second wireless reader 802 makes an attempt to communicate with the conveyed original document.

In an example embodiment of the present patent application, when a detection signal indicating that the read inlet sensor 39 has detected the leading edge of the original document and a signal indicating that the second wireless communication reader 802 has detected the ID number data of the original document are transmitted, the ADF controller 100 that serves as a sorting unit may sort the electronic data containing the whole pages of the electronic paper 900, which has been read by the first wireless communication reader 801 and stored in association with the ID number, in a specific order, e.g., an order of stack, of conveyance, etc., in which both the electronic papers 900 and the non-electronic papers may be mixed.

In FIG. 2, the ADF controller 100 may rotate and stop the document feed motor 102 so as to make the transfer distance longer by Y mm than the distance from the read inlet sensor 39 to the pair of read inlet rollers 37. The original document transferred to the nip contact of the pair of read inlet rollers 37 may be stopped while being bowed in a constant manner with the leading edge thereof abutting against the nip contact of the pair of read inlet rollers 37 that is being stopped. This can correct skew occurred when the pair of pull-out rollers 36 is conveying the original document.

In an example embodiment of the present patent application, the pair of read inlet rollers 37 may include a pair of rollers dedicated for correcting skew.

Further, when an original document is temporarily stopped at the nip contact of the pair of read inlet rollers 37 (which is referred to as a "registration stop"), the ADF controller 100 may transmit a registration stop signal to the main body controller 111 via the I/F 107.

When the registration stop signal is transmitted to the main body controller 111, the ADF controller 100 may receive a read start signal from the main body controller 111.

When the original document that has been stopped due to the registration stop is a paper sheet, the ADF controller 100 drives a document read motor 103 (see FIG. 6) so that the original document can be transferred at a transfer speed according to a read scan magnification.

When the original document is an electronic paper 900, the ADF controller 100 drives the document read motor 103 so that the original document can be transferred at a speed faster than the speed of transferring the paper sheet.

The ADF controller 100 then causes a pair of read outlet rollers 40 to transfer the original document. The pair of read outlet rollers 40 serves as a document conveyance unit, and includes a read outlet drive roller 40a and a read outlet driven roller 40b.

When the read start signal is received before the leading edge of the original document of paper sheet reaches a registration sensor 41 that is mounted at an upstream side from the slit glass 22b, the ADF controller 100 may cause the scanner 81 to read without executing the registration stop. In this operation, the original document may not be stopped at the nip contact of the pair of read inlet rollers 37 and is transferred and scanned while the scan transfer speed is maintained.

When the registration sensor 41 detects the leading edge of the original document of paper sheet, the ADF controller 100 may start a pulse count or counting pulses of the document read motor 103. At the timing that the leading edge of the original document reaches the scanning position 80 on the slit glass 22b, the ADF controller 100 may transmit a gate signal that indicates a variable image area in a sub-scanning direction, to the main body controller 111. The ADF controller 100 generally keeps transmitting the gate signal until the trailing edge of the original document completely passes over the scanning position 80.

After passing over the scanning position 80 via a reverse path 53, the original document may be reversed from the front face to the reverse face and transferred by the pair of read outlet rollers 40 and a document discharging roller set 42. After a front face side or both sides of the original document are scanned or read, the original document may be discharged to a document discharging tray 43 that serves as a document discharging member.

Further, the document discharging roller set 42 includes a discharge drive roller 42a, an upper discharge driven roller 42b, and a lower discharge driven roller 42c. At a downstream side of the document discharging roller set 42, a path selector 44 is disposed.

When scanning the front face of a double face original document in transfer of the double face original document, before the leading edge of the double face original document passing over the scanning position 80 reaches the document discharging roller set 42, a switchback solenoid 105 (see FIG. 6) may drive the path selector 44 to be switched to the position indicated by the chain double-dashed line in FIG. 2.

At this time, the discharge drive roller 42a and the lower discharge driven roller 42c driven by the document read motor 103 and a pair of switchback rollers 45 driven by a document switchback motor 104 (see FIG. 6) may transfer the original document to a switchback path 46a, which serves as a switchback path and/or a reverse path. The pair of switchback rollers 45 serves as a document discharging unit, and includes a switchback drive roller 45a and a switchback driven roller 45b.

After a read outlet sensor 47 that is disposed downstream from the pair of read outlet rollers 40 has detected the trailing edge of the original document and the drive pulses of the document read motor 103 has reached a reference number of pulses, the ADF controller 100 may determine that the trailing edge of the original document has passed the document discharging roller set 42 and turn off the switchback solenoid 105 to move the path switching member 44 to the position that is indicated by the solid line shown in FIG. 2.

As previously described, after the number of drive pulses of the document read motor 103 has reached the reference number of pulses, the ADF controller 100 may drive the document switchback motor 104 to rotate in a reverse direction to rotate the pair of switchback rollers 45 in a reverse direction, thereby switching back the original document toward the pair of pull-out rollers 36.

At this time, the rotation direction of the document read motor 103 is in the normal direction and the rotation direction of the document switchback motor 104 is the opposite or reverse direction of the document transfer direction. The document switchback motor 104 and the document read motor 103 may be driven at high speed, thereby reducing the processing time.

After the switchback of the original document has been started, the number of drive pulses of the document switchback motor 104 may shortly reach the reference number of pulses. After that, the ADF controller 100 may drive the document feed motor 102 in a reverse direction at high speed, thereby transferring the original document to the pair of pull-out rollers 36 at high speed.

When a switchback sensor 49 detects the trailing edge of the original document that is transferred to a re-entry path 46b, which serves as a reverse path, the ADF controller 100 may stop the reverse rotation of the pair of switchback rollers 45, based on the detection results obtained from the switchback sensor 49.

After the stop of the pair of switchback rollers 45, the pair of pull-out rollers 36 may correct the skew of the original document, and thus, one side or front face of the original document is scanned. Then, the original document may be switched back again into the switchback path 46a, and pass through the re-entry path 46b, and be transferred toward the scanning position 80. Thus, the original document may be reversed without being scanned or read, be collated in a proper page order, and be discharged to the document discharging tray 43.

Further, a discharge sensor 50 is disposed upstream from the document discharging roller set 42. The discharge sensor 50 may detect the trailing edge of the original document to output a signal to the ADF controller 100. Based on the detection results, the ADF controller 100 may determine that the original document is discharged.

The copier main body 21a further includes a display panel 48. The ADF controller 100 may determine whether a jam has occurred, based on the respective detection results from the abutment sensor 35, the read inlet sensor 39, the registration sensor 41, the read outlet sensor 47, the switchback sensor 49, the discharge sensor 50, the document length detection sensors 25, 26, and 27, and so forth. When it is determined that the jam has occurred, the ADF controller 100 may display a message on the display panel 48 to inform the occurrence of jam.

The copier main body 21a of the copier 21 shown in FIG. 1 further includes the scanner 81, a writing device 82, and a photoconductive drum 83. Image data that has been read by the scanner 81 may be exposed and written by the writing device 82 to the photoconductive drum 83.

The scanner 81 of FIG. 1 includes a light source 81a, a first mirror 81b, a second mirror 81c, a third mirror 81d, a lens 81e, and a charge-coupled device (CCD) image sensor 81f, which are image forming components.

The light source 81a may illuminate an original document placed on the contact glass 22a or the slit glass 22b.

The first mirror 81b, the second mirror 81c, and the third mirror 81d may respectively reflect light reflected by the original document.

The lens 81e may form the light reflected by the third mirror 81d to the CCD image sensor 81f.

The CCD image sensor 81f may convert the light formed as image by the lens 81e into an electrical signal.

The light source 81a and the first mirror 81b are mounted on a first moving member 81g, and the second mirror 81c and the third mirror 81d are mounted on a second moving member 81h.

The first moving member 81g and the second moving member 81h form a moving mechanism 81j may move along the contact glass 22a and the slit glass 22b in FIG. 1.

When reading or scanning an original document that is placed on the contact glass 22a, the moving mechanism 81j including the first moving member 81g and the second moving member 81h may be moved or slid under the contact glass 22a in the left and right directions or horizontal direction in FIG. 1.

When reading or scanning an original document that is passing over the slit glass 22b, the first moving member 81g and the second moving member 81h forming the moving mechanism 81j may be stopped under the slit glass 22b.

The scanner 81 can read or scan images, i.e., text, drawing, picture, and so forth, on a paper sheet and the electronic paper 900.

The writing device 82 may emit a laser light beam that is modulated according to the image data read by the scanner 81, and expose the charged surface of the photoconductive drum 83 with the laser light beam.

Various image forming components and parts may be arranged around the photoconductive drum 83 and form an image forming mechanism 89. The image forming mechanism 89 includes, for example, a developing device 86, a transfer belt 87, a cleaning device 88, a charging device, not shown, and a discharging device, not shown.

The charging device may charge the surface of the photoconductive drum 83 to a constant potential, by a positive corona discharge in the dark that is controlled by a grid.

The writing device 82 may emit a laser diode including image data onto the uniformly charged surface of the photoconductive drum 83 and remove the negative charge on the surface of the photoconductive drum 83 to form an electrostatic latent image.

The developing device 86 may adhere negatively charged toner onto a charge discharged portion on the surface of the photoconductive drum 83 to form a visible toner image.

The transfer belt 87 that is applied with a positive bias may transfer the visible toner image that is negatively charged onto a transfer sheet serving as a recording medium and convey the transfer sheet having the visible toner image thereon.

The cleaning device 88 may include a cleaning blade, not shown, to scrape residual toner remaining on the surface of the photoconductive drum 83.

The discharging device may remove residual charge from the surface of the photoconductive drum 83 by illuminating light-emitting diodes (LEDs) to cause the photoconductive drum 83 to be ready for a subsequent image forming operation onto a subsequent transfer sheet.

The transfer sheet having the visible toner image formed as described above may be transferred to a fixing device 90, by which the visible toner image may be fixed onto the transfer sheet.

In addition, the copier main body 21a of the copier 21 of FIG. 1 includes a plurality of sheet cassettes 91, 92, 93, 94, and 95, in which respective transfer sheets TS1, TS2, TS3, TS4, and TS5 having various sizes are accommodated.

The transfer sheets TS1, TS2, TS3, TS4, and TS5 accommodated in the plurality of sheet cassettes 91, 92, 93, 94, and 95, respectively, may be picked up and fed to a sheet transfer path by pickup rollers 91a, 92a, 93a, 94a, and 95a, respectively. The transfer sheets TS1, TS2, TS3, TS4, and TS5 may then be separated by sheet feeding rollers 91b, 92b, 93b, 94b, and 95b, rotating in a sheet travel direction, and reverse rollers 91c, 92c, 93c, 94c, and 95c, being held in sliding contact with the sheet feeding rollers 91b, 92b, 93b, 94b, and 95b, respectively, and rotating in a separating direction.

After the separation, the transfer sheets TS1, TS2, TS3, TS4, and TS5 may be transferred to a pair of registration rollers 98 via a pair of relay rollers 96 and 97. The transfer sheets TS1, TS2, TS3, TS4, and TS5 may be fed and stopped at the pair of registration rollers 98. After a reference time, the transfer sheets TS1, TS2, TS3, TS4, and TS5 may be conveyed to the sheet transfer path formed between the photoconductive drum 83 and the transfer belt 87.

The electronic data of the electronic paper 900 read in a batch by the first wireless communication reader 801 and the electronic data of the paper sheet read one by one by the scanner 81 are sorted and rearranged into the order of stack or transfer according to a document order table, which is described later in reference to FIG. 14, converted in a common format, and stored in a specific area of a memory of the ADF controller 100 or the main body controller 111 or an external memory, not shown. Each of the ADF controller 100 and the main body controller 111 serves as a storage unit. The previously described ID number may be used as a name to identify the electronic data of the electronic paper 900. Alternatively, identification information having a format common to identification information for identifying the electronic data of the paper sheet may be newly added so as to specify a relation of the new identification information and the foregoing ID number.

Next, operations of transferring original documents are described, referring to flowcharts shown in FIG. 7 through FIG. 13.

The flowcharts of FIGS. 7 through 13 illustrate a document transfer control performed by the ADF controller 100 for controlling the transfer operation of the copier 21. Control programs including the document transfer control operation is controlled by the ADF controller 100 or the main body controller 111 to perform the above-described communication reading operation, determination control, transfer control, optical reading control, and electronic data order control. This document transfer control is used to perform a one-side printing mode in which one side or a front side of an original document, i.e., a paper sheet or an electronic paper, can be scanned and conveyed.

Figure 7:
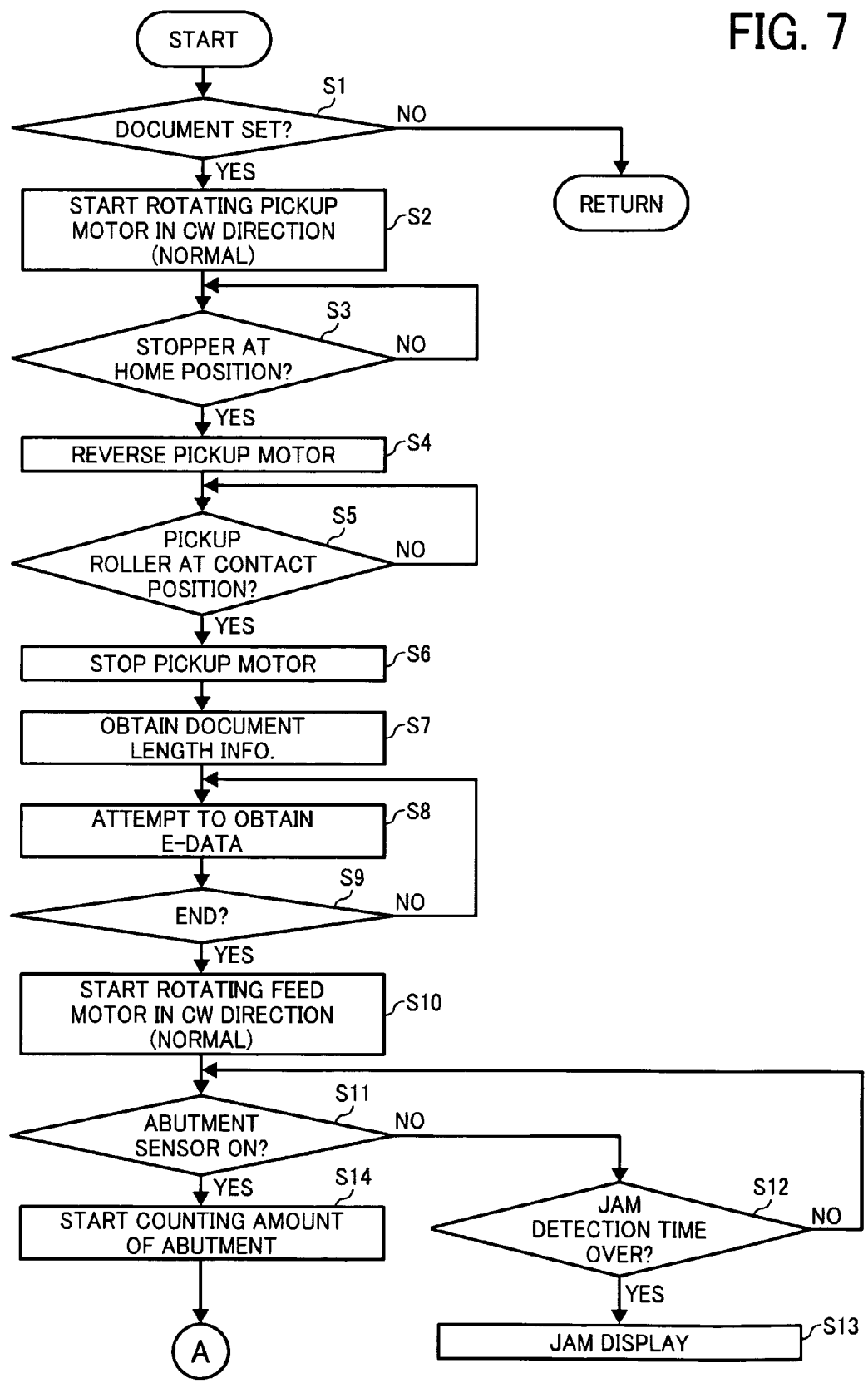
FIG. 7 is a flowchart of a transfer control for feeding an original document, executed in the image reading system of FIG. 1, according to an example embodiment of the present patent application.

In step S1 in the flowchart of FIG. 7, the ADF controller 100 determines whether an original document stack DS is set on the document setting table 24, based on the detection results determined by the document length detection sensors 25, 26, and 27.

When a print key on the control panel 108 is pressed, the main body controller 111 sends the document pickup signal to the ADF controller 100 via the I/F 107.

In step S2, the ADF controller 100 drives the document pickup motor 101 to rotate in a normal direction, which is in a clockwise direction. At this time, the document stopper 28 moves away from the leading edge of the original document stack DS.

Then, in step S3, the ADF controller 100 determines whether the document stopper 28 has moved to its home position, based on the detection result of the home position sensor 34.

When it is determined that the document stopper 28 has moved to its home position, the result of step S3 is YES, and the ADF controller 100 rotates the document pickup motor 101 in a reverse direction in step S4.

By contrast, when it is determined that the document stopper 28 has not moved to its home position, the result of step S3 is NO, and the ADF controller 100 repeats step S3 until it is determined that the document stopper 28 moves to its home position.

After step S4, the ADF controller 100 determines whether the document pickup roller 31 has moved to its contact position in step S5.

When it is determined that the document pickup roller 31 has not moved to its contact position, the result of step S5 is NO, and the ADF controller 100 repeats step S5 until the document pickup roller 31 moves to the contact position.

When it is determined that the document pickup roller 31 has moved to its contact position, the result of step S5 is YES, the ADF control 100 stops the document pickup motor 101 in step S6, obtains the length of the original document, based on the result detected by the document length detection sensors 25, 26, and 27 in step S7.

The ADF controller 100 sends the first wireless communication reader 801 instructions to conduct scanning via communication. In response, the first wireless communication reader 801 makes an attempt to scan the original document via communication in the vicinity of the document pickup roller 31 in step S8. In step S9, the ADF controller 100 determines whether the attempt of the communication reading or scanning has been completed.

When the attempt has not been completed, the result of step S9 is NO, and the ADF controller 100 goes back to step S8.

When the attempt has been completed, the result of step S9 is YES, and the ADF controller 100 performs step S10, which will be described later.

Then, the ADF controller 100 obtains an ID number data signal through communication with the original document, a signal that indicates electronic data of the original document, which is the whole pages of the electronic paper 900, is obtained. Then, the ID number data and the electronic data of the electronic paper 900 are sent to the ADF controller 100. When two or more electronic papers 900 are loaded on the document setting table 24, both the ID number data and the electronic data of the multiple electronic papers 900 are obtained and sent to the ADF controller 100. When no sign of the electronic paper 900 is detected, the ADF controller 100 keeps the attempt for a given period and the procedure proceeds to step S10.

In step S10, the ADF controller 100 rotates the document feed motor 102 in a normal direction, which is in a clockwise direction. With the above-described operation, after the document pickup roller 31 has separated an original document on top of the original document stack DS, this original document can be transferred by the document feeding belt 32 and the reverse roller 33.

After step S10, the ADF controller 100 determines, in step S11, whether the abutment sensor 35 has been turned on.

When it is determined that the abutment sensor 35 has not been turned on, the result of step S11 is NO, and the ADF controller 100 determines whether the jam detection time is over or not in step S12.

When it is determined that the jam detection time is not over, the result of step S12 is NO, and the ADF controller 100 repeats step S12 until the jam detection time is over.

When it is determined that the jam detection time is over, the result of step S12 is YES, and the ADF controller 100 determines that a jam indicating that the original document is not abut against the nip portion of the pair of pull-out rollers 36 has occurred and displays a message on the display panel 48 to inform the occurrence of jam in step S13.

When it is determined that the abutment sensor 35 has been turned on, the result of step S11 is YES, and the ADF controller 100 counts the amount or length of abutment of the leading edge of the original document, in step S14. Specifically, the ADF controller 100 starts counting the drive pulses of the document feed motor 102 that correspond to a reference amount or length of X mm, which is set greater than the distance between the abutment sensor 35 and the pair of pull-out rollers 36.

Figure 8:
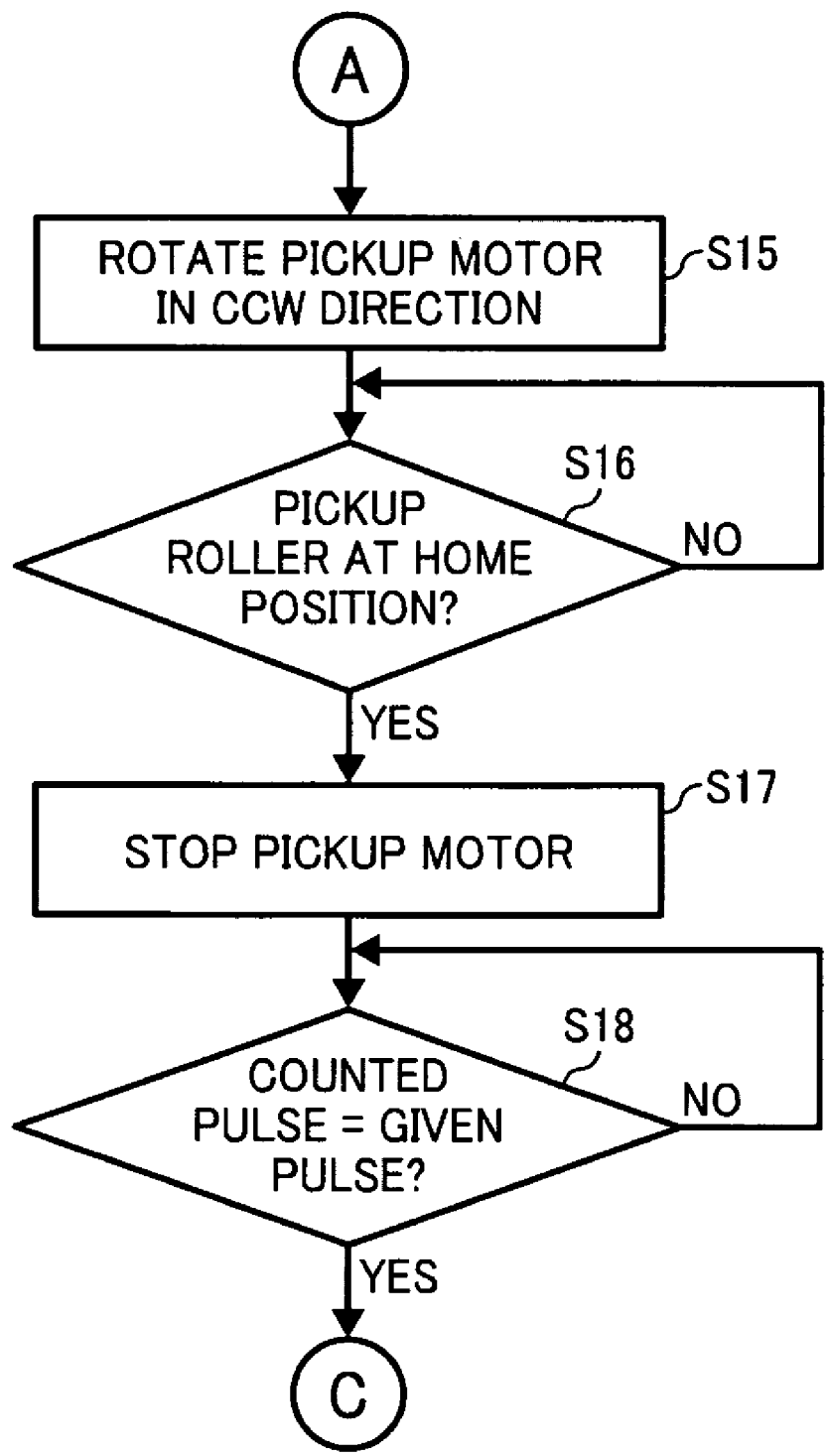
FIG. 8 is a flowchart of the transfer control for feeding the original document, continued from FIG. 7.

After step S14, the process proceeds to process A, where process A starts at step S15 in FIG. 8.

As shown in the flowchart of FIG. 8, the ADF controller 100 rotates the document pickup motor 101 in a reverse direction, which is a counterclockwise direction in step S15, and determines whether the document pickup roller 31 has moved to its home position in step S16.

When it is determined that the document pickup roller 31 has not moved to the home position, the result of step S16 is NO, and the ADF controller 100 repeats step S16 until the document pickup roller 31 moves to the home position.

When it is determined that the document pickup roller 31 has moved to the home position, the result of step S16 is YES, and the ADF controller stops the rotation of the document pickup motor 101 in step S17, and determines whether the number of counted pulses of the document feed motor 102 has reached the reference number of pulses that corresponds to the amount or length of abutment (X mm) in step S18.

When it is determined that the number of counted pulses of the document feed motor 102 has not reached the reference number of pulses, the result of step S18 is NO, and the ADF controller 100 repeats step S18 until the number of counted pulses of the document feed motor 102 reaches the reference number of pulses.

Figure 9:
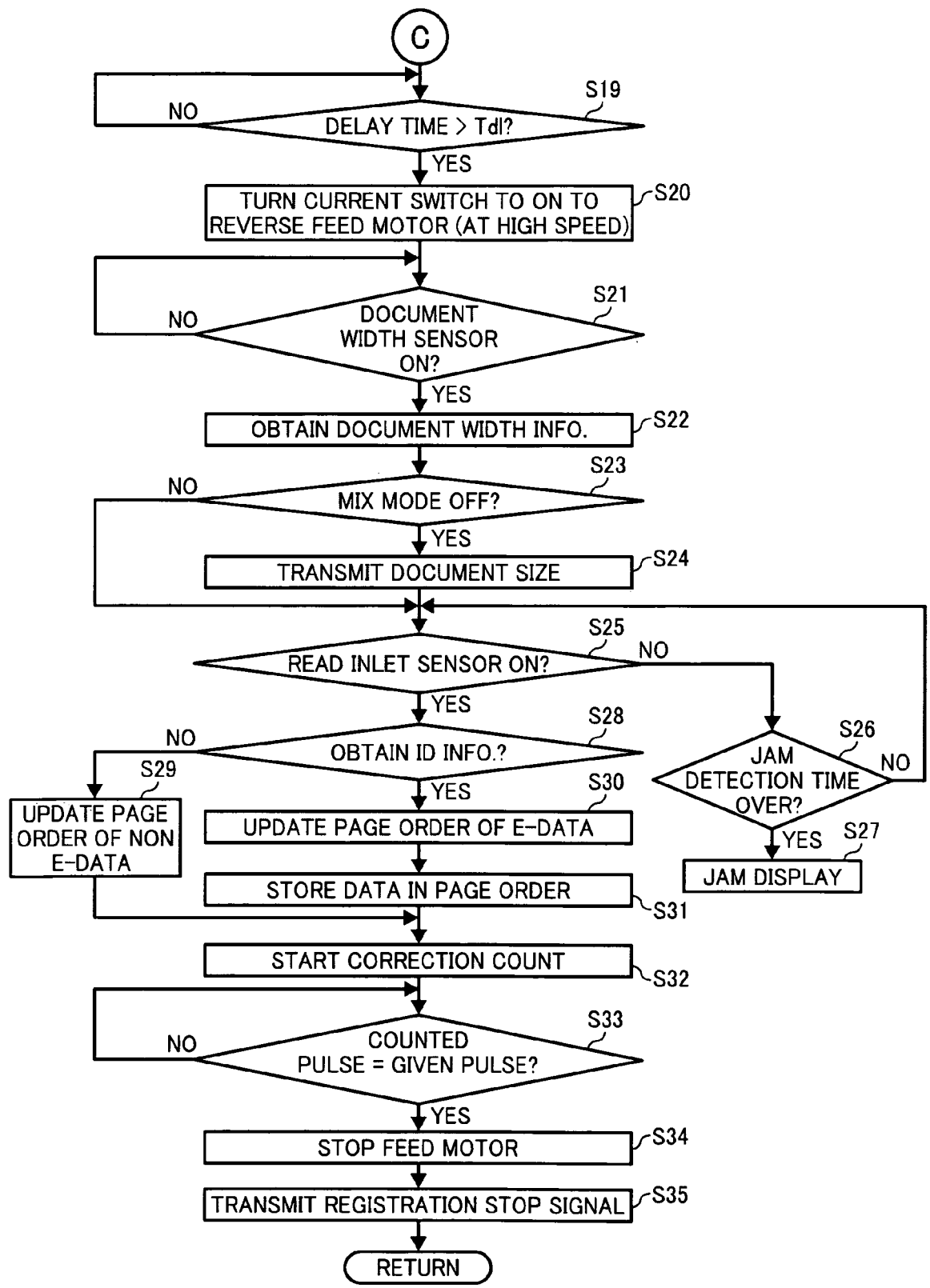
FIG. 9 is a flowchart of the transfer control for feeding the original document, continued from FIG. 8.

When it is determined that the number of counted pulses of the document feed motor 102 has reached the reference number of pulses, the result of step S18 is YES, and the process proceeds to process C, where process C starts at step S19 in FIG. 9.

In step S19 in the flowchart of FIG. 9, the ADF controller 100 determines whether the delay time is greater than the time Tdl.

When it is determined that the delay time is equal to or smaller than the time Tdl, the result of step S19 is NO, and the ADF controller 100 repeats step S19 until the delay time becomes greater than the time Tdl.

When it is determined that the delay time is greater than the time Tdl, the result of step S19 is YES, and the process proceeds to step S20.

At the timing that the number of counted pulses of the document feed motor 102 has reached the reference number of pulses, the original document is pressed against the pair of pull-out rollers 36 and bent while being bowed with a reference amount. Under such condition, the skew caused by the bow with the reference amount is corrected.

Now, in an example embodiment of the present patent application, a time required for the trailing edge of a preceding or first original document to pass from the scanning position 80 to the document discharging roller set 42 is represented as "Tyo", and a time required for the leading edge of a following or second original document to move from the pair of pull-out rollers 36 to the nip portion of the pair of read inlet rollers 37, which is the registration stop position (reading standby position) for the original document to stop temporarily is represented as "Tpo."

By providing a time "Tdl" that satisfies a relation of Tyo< (Tpo+Tdl), the ADF controller 100 may transfer the second original document from the pair of pull-out rollers 36.

In step S20, the ADF controller 100 turns the switch of the current of the document feed motor 102 to ON to drive the document feed motor 102 to rotate at high speed.

When the document feed motor 102 is rotated in a reverse direction, the pair of pull-out rollers 36 is driven whereas the one-way clutch of the pulley 140 prevents the transmission of the driving force to the document pickup roller 31 and the document feeding belt 32. Therefore, the original document is conveyed by the pair of pull-out rollers 36.

In step S21, the ADF controller 100 determines whether the document width detection sensors 38 have been turned on.

When it is determined that the document width detection sensors 38 have not been turned on, the result of step S21 is NO, and the ADF controller 100 repeats step S21 until the document width detection sensors 38 is turned on.

When it is determined that the document width detection sensors 38 have been turned on, the result of step S21 is YES, and the ADF controller 100 obtains, in step S22, information of the width of the original document based on the detection result determined by the document width detection sensors 38.

According to the above-described result, the ADF controller 100 can obtain information of the size of the original document stack DS accumulated on the document setting table 24, based on the combination of the length information provided by the document length detection sensors 25, 26, and 27 and the width information provided by the document width detection sensors 38.

At this time, the original document is conveyed toward the scanning position 80 while being sandwiched between the pair of pull-out rollers 36 and the pair of read inlet rollers 37. The transfer speed of the original document is set to high speed, which can reduce the processing time to transfer the original document to the scanning position 80. Specially, when transferring the second original document or after, the document transfer in high speed can reduce the intervals between the preceding original document and the following document, which can enhance the productivity of print images.

After step S22, the ADF controller 100 determines whether the mix mode has been turned off in step S23.

When it is determined that the mix mode has been turned off, the result of step S23 is YES, and the ADF controller 100 sends the size information of the original document stack DS accumulated on the document setting table 24, to the main body controller 111 in step S24, and determines whether the read inlet sensor 39 has been turned on to detect the leading edge of the original document in step S25.

When it is determined that the mix mode has not been turned off, the result of step S23 is NO, and the process skips step S24 and proceeds to step S25.

When it is determined that the read inlet sensor 39 has been not been turned on to detect the leading edge of the original document, the result of step S25 is NO, and the ADF controller 100 determines whether the jam detection time has been over in step S26.

When it is determined that the jam detection time has not been over, the result of step S26 is NO, and the process returns to step S25.

When it is determined that the jam detection time has been over, the result of step S26 is YES, and the ADF controller 100 determines that a jam indicating that the leading edge of the original document has not reached the read inlet sensor 39 has occurred and displays a message on the display panel 48 to inform the occurrence of the jam, in step S27.

On the other hand, when it is determined that the read inlet sensor 39 has been turned on, the result of step. S25 is YES, and the ADF controller 100 determines whether the second wireless communication reader 802 has obtained the identification information and sent the signal indicating the ID number data in step S28.

When it is determined that the second wireless reader 802 has not sent the signal indicating the ID number data, the result of step S28 is NO, and the ADF controller 100 determines that the original document is a non-electronic paper or a paper sheet, and updates or rearranges the page order of the original document, in step S29. Then, the process proceeds to step S32.

When it is determined that the second wireless reader 802 has sent the signal indicating the ID number data, the result of step S28 is YES, the ADF controller 100 determines that the original document is an electronic paper, updates the page order of the electronic data of the whole pages of the electronic paper which the first wireless reader 801 scanned via communication and stored in the memory in association with the ID number, in step S30, and sorts and rearranges the ID number and electronic data of the electronic paper according to the updated page order, in step S31.

The update of page order of the original documents is performed according to the document order table, which will be described later in reference to FIG. 14.

After step S31, the ADF controller 100 starts the correction count of the amount or length of abutment of the leading edge of the original document, in step S32. Specifically, the ADF controller 100 starts counting the drive pulses of the document feed motor 102 that corresponds to a reference amount of Y mm, which is an amount greater than the distance between the read inlet sensor 39 and the pair of read inlet rollers 37.

After step S32, the ADF controller 100 determines whether the pulse count of the document feed motor 102 has reached the reference number of pulses that corresponds to the amount or length of abutment (Y mm) in step S33.

When it is determined that the pulse count of the document feed motor 102 has not reached the reference number of pulses, the result of step S33 is NO, and the ADF controller 100 repeats step S33 until the pulse count reaches the reference number of pulses.

When it is determined that the pulse count of the document feed motor 102 has reached the reference number of pulses, the result of step S33 is YES, and the ADF controller 100 causes the document feed motor 102 to stop in step S34, sends the registration stop signal to the main body controller 111 in step S35, and completes the transfer control of the original document to the scanning position 80 to return to the start of the operation for a subsequent original document.

At the timing that the document feed motor 102 has reached the reference number of pulses, the original document is pressed contact to the pair of read inlet rollers 37 while being bowed with a reference amount. Under such condition, the skew caused by the bow with the reference amount is corrected.

Figure 10:
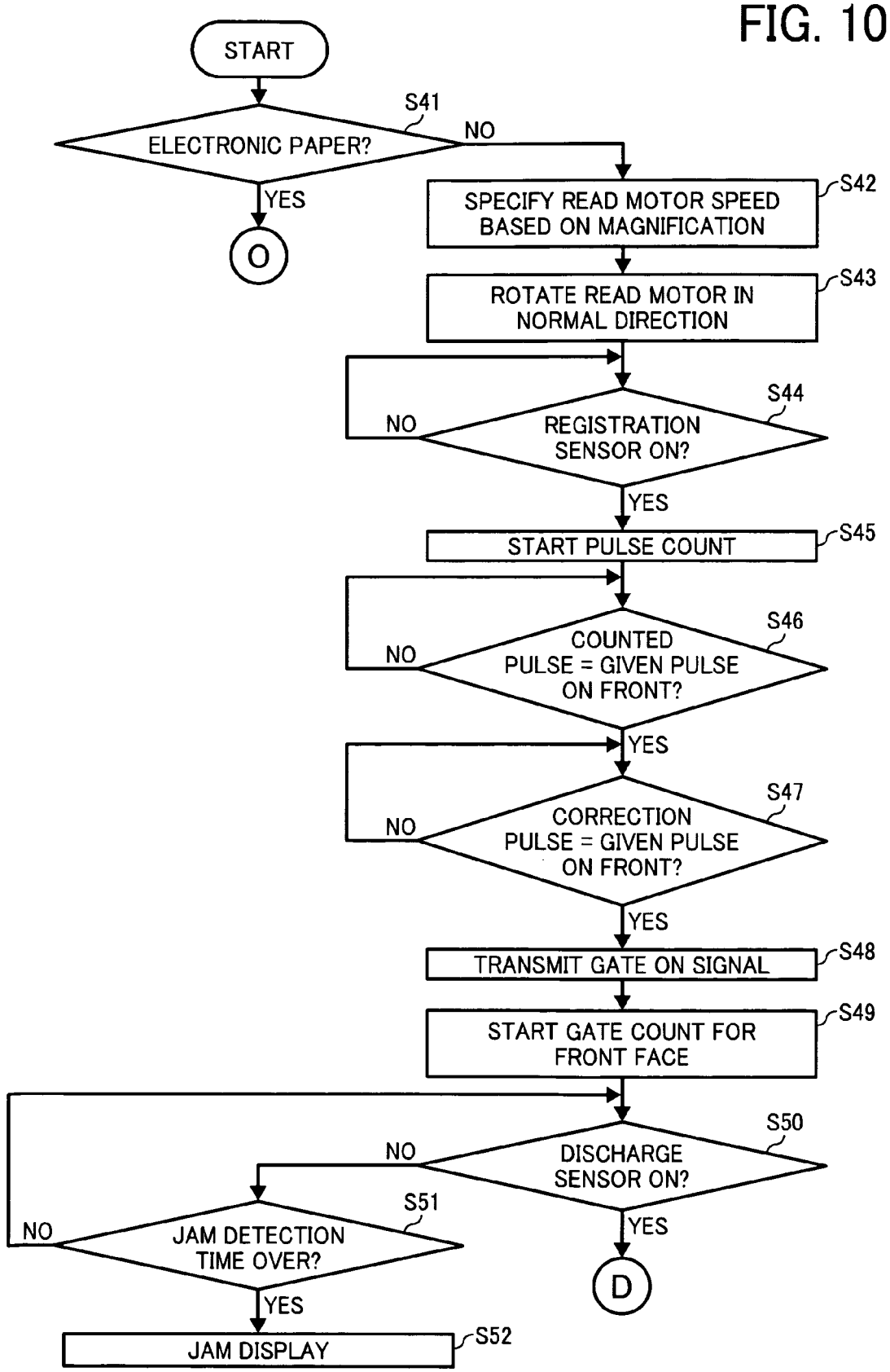
FIG. 10 is a flowchart of the transfer control for reading the original document, according to an example embodiment of the present patent application.

The flowchart shown in FIG. 10 describes a flow of control operation of transferring an original document while reading the original document.

In the flowchart of FIG. 10, the ADF controller 100 determines whether the original document is an electronic paper or not in step S41.

Figure 12:
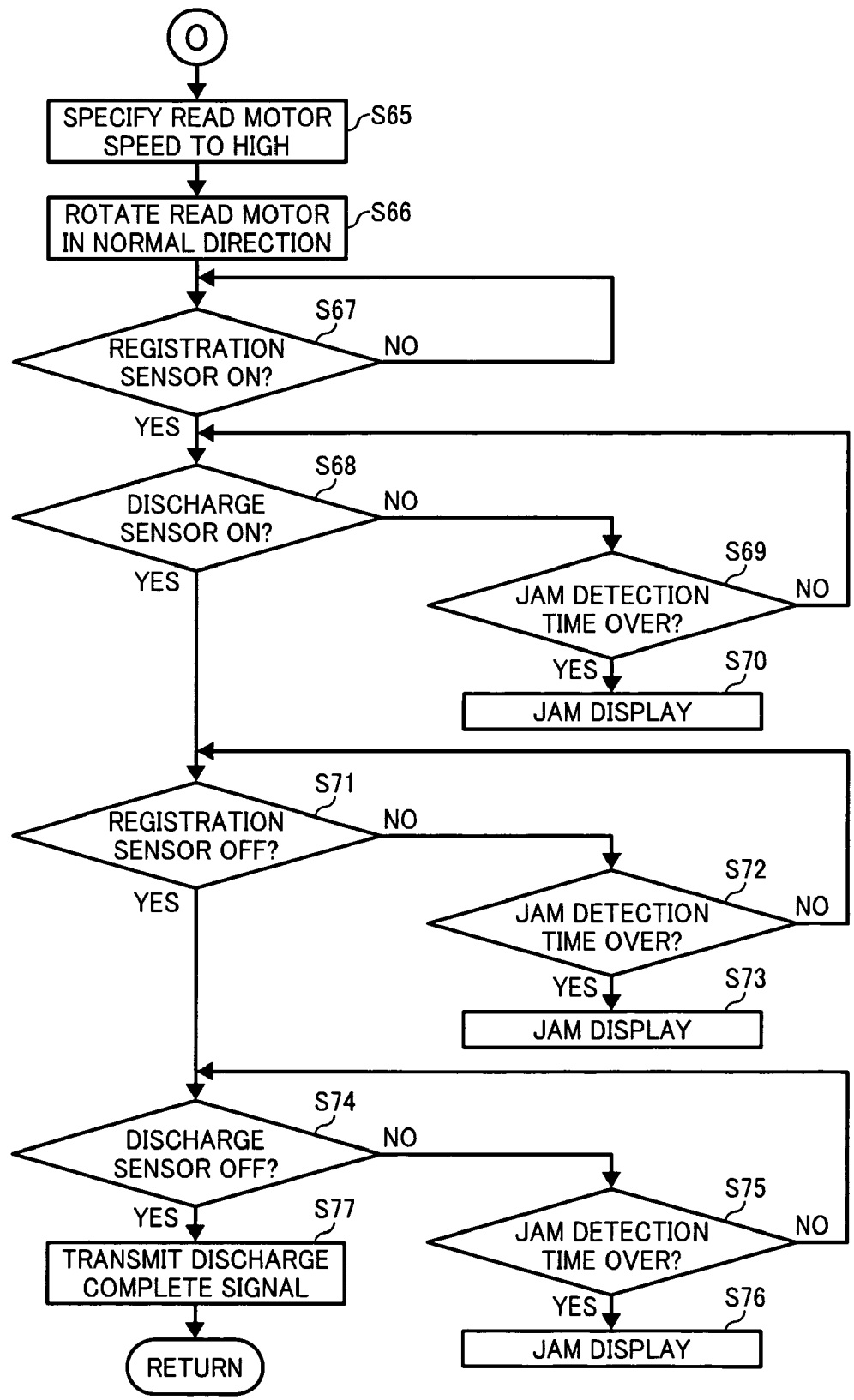
FIG. 12 is a flowchart of the transfer control for reading the original document, continued from FIG. 12.

When it is determined that the original document is not an electronic paper but a non-electronic paper, the result of step S41 is NO, and the process proceeds to process O, where process O starts at step S65 in FIG. 12. Details of the operation of step S65 will be described later.

When it is determined that the original document is an electronic paper, the result of step S41 is YES, the ADF controller 100 specifies the speed of the document read motor 103 based on the read scan magnification in step S42. Sequentially, the ADF controller 100 receives the read start signal from the main body controller 111, and starts to execute the scanning operation of the original document.

It is noted that an electronic paper displays images only on one side or front surface thereof. Therefore, the single face mode includes a case in which either one a non-electronic paper and an electronic paper is read and conveyed or both are read and conveyed in a mixed manner.

The ADF controller 100 drives the document read motor 103 to rotate in a normal direction, in step S43, so as to rotate the pair of read inlet rollers 37 and the pair of read outlet rollers 40 at the transfer speed according to the read scan magnification.

After step S43, the ADF controller 100 determines whether the registration sensor 41 has been turned on to detect the leading edge of the original document in step S44.

When it is determined the registration sensor 41 has not been turned on to detect the leading edge of the original document, the result of step S44 is NO, and the ADF controller 100 repeats step S44 until the registration sensor 41 is turned on to detect the leading edge of the original document.

When it is determined that the registration sensor 41 has been turned on to detect the leading edge of the original document, the result of step S44 is YES, and ADF controller 100 starts counting the number of pulses of the document read motor 103 in step S45.

After step S45, the ADF controller 100 determines, in step S46, whether the number of counted pulses of the document read motor 103 has reached a reference number of pulses for the front face of the original document, which corresponds to the distance of the registration sensor 41 and the scanning position 80 on the slit glass 22*b*.

When it is determined that the number of counted pulses of the document read motor 103 has not reached a reference number of pulses for the front face of the original document, the result of step S46 is NO, and the ADF controller 100 repeats step S46 until the number of counted pulse counts of the document read motor 103 reaches a reference number of pulses for the front face of the original document.

When it is determined that the number of counted pulses of the document read motor 103 has reached a reference number of pulses for the front face of the original document, the result of step S46 is YES, and the ADF controller 100 determines, in step S47, whether the number of correction pulses that account for the slip ratio and so forth of the original document has reached a reference number of pulses for the front face of the original document.

When it is determined that the number of correction pulses has not reached a reference number of pulses for the front face of the original document, the result of step S47 is NO, and the ADF controller repeats step S47 until the number of correction pulses reaches a reference number of pulses for the front face of the original document.

When it is determined that the number of correction pulses has reached a reference number of pulses for the front face of the original document, the result of step S47 is YES, the ADF controller 100 sends the gate signal that indicates an image area in a sub-scanning direction, to the main body controller 111 at the timing that the leading edge of the original document reaches the scanning position 80 in step S48, starts counting the number of the gate counts for the front face of the original document in step S49, and determines whether the discharge sensor 50 has been turned on to detect the leading edge of the original document in step S50.

When it is determined that the discharge sensor 50 has not been turned on to detect the leading edge of the original document, the result of step S50 is NO, and the ADF controller 100 determines whether the jam detection time has been over or not in step S51.

When it is determined that the jam detection time has not been over, the result of step S51 is NO, and the process goes back to step S50.

When it is determined that the jam detection time has been over, the result of step S51 is YES, and the ADF controller 100 determines a jam indicating that the leading edge of the original document has not reached the discharge sensor 50 has occurred and displays a message on the display panel 48 to inform the occurrence of the jam in step S52.

Figure 11:
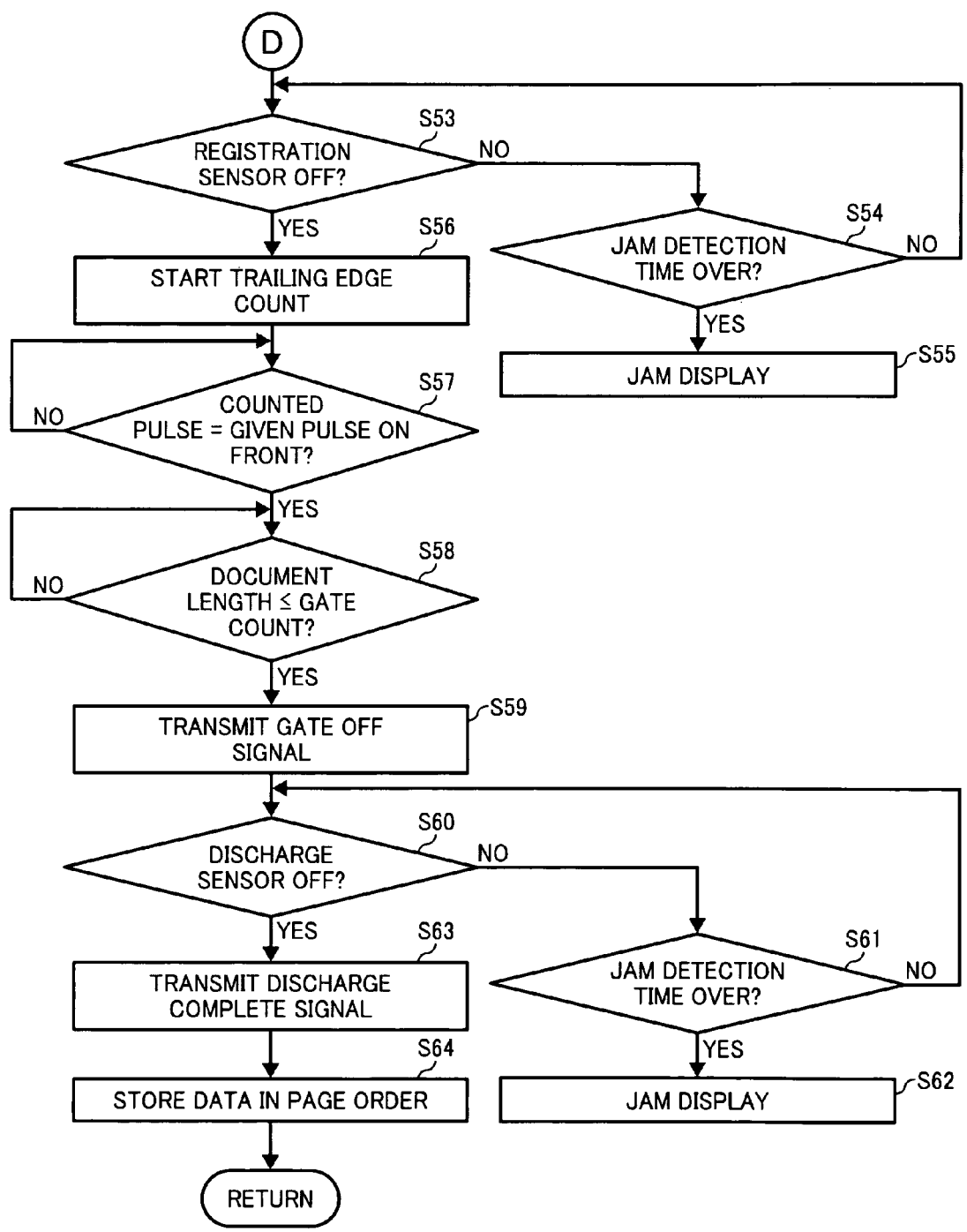
FIG. 11 is a flowchart of the transfer control for reading the original document, continued from FIG. 10.

On the other hand, when it is determined that the discharge sensor 50 has been turned on to detect the leading edge of the original document, the result of step S50 is YES, the ADF controller 100 determines whether the registration sensor 41 has been turned off in process D starting at step S53, as shown in FIG. 11.

When it is determined that the registration sensor 41 has not been turned off, the result of step S53 is NO, and the ADF controller 100 determines whether the jam detection time has been over in step S54.

When it is determined that the jam detection time has not been over, the result of step S54 is NO, and the process returns to step S53.

When it is determined that the jam detection time has been over, the result of step S54 is YES, and the ADF controller 100 determines that a jam indicating that the original document has not reached the document discharging tray 43 has occurred and displays a message on the display panel 48 to inform the occurrence of the jam in step S55.

Further, when it is determined that the registration sensor 41 has been turned off, the result of step S53 is YES, and the ADF controller 100 starts the trailing edge count for counting the number of pulses of the document read motor 103 in step S56, and determines whether the number of counted pulses of the document read motor 103 has reached a reference number of pulses for the front face of the original document in step S57.

When it is determined that the number of counted pulses of the document read motor 103 has not reached the reference number of pulses for the front face of the original document, the result of step S57 is NO, and the ADF controller 100 repeats step S57 until the number of counted pulses of the document read motor 103 reaches a reference number of pulses for the front face of the original document.

When it is determined that the number of counted pulses of the document read motor 103 has reached a reference number of pulses for the front face of the original document, the result of step S57 is YES, and the ADF controller 100 determines whether the number of counted gate pulses is equal to or greater than the length of the original document, in step S58.

When it is determined that the number of counted gate pulses is smaller than the length of the original document, the result of step S58 is NO, and the ADF controller 100 repeats step S58 until the number of counted gate pulses becomes equal to or greater than the length of the original document.

When it is determined that the number of counted gate pulses is equal to or greater than the length of the original document, the result of step S58 is YES, and the ADF controller 100 sends the gate off signal that indicates the image area in the sub-scanning direction in step S59, and determines whether the discharge sensor 50 has been turned off in step S60.

When it is determined that the discharge sensor 50 has not been turned off, the result of step S60 is NO, and the ADF controller 100 determines whether the jam detection time has been over in step S61. When it is determined that the jam detection time has not been over, the result of step S61' is NO, and the process goes back to step S60.

When it is determined that the jam detection time has been over, the result of step S61 is YES, the ADF controller 100 determines that a jam indicating that the original document is not completely discharged has occurred and displays a message on the display panel 48 to inform the occurrence of the jam in step S62.

When it is determined that the discharge sensor 50 has been turned off, the result of step S60 is YES, the ADF controller 100 sends the discharge completion signal to the main body controller 111 in step S63, sorts the image data or electronic data of the non-electronic paper or paper sheet and stores the data in the memory according to the updated page order in step S64, and completes the procedure to return to the start of the operation for a sequential original document. The update of page order of the original documents is performed according to the document order table, which will be described later in reference to FIG. 14. Further, a transfer pressure between the rollers related to the read and transfer operation is specified in step S64.

As previously described, when it is determined that the original document is not in the single face mode, the result of step S41 is NO, and the process proceeds to process O, where process O starts at step S65 of FIG. 12.

In step S65, the ADF controller 100 specifies the read motor speed of the document read motor 103 based on the read scan magnification, then receives the read start signal from the main body controller 111, and starts reading the original document.

After step S65, the ADF controller 100 drives the document read motor 103 to rotate in a normal direction, in step S66, so as to rotate the pair of read inlet rollers 37 and the pair of read outlet rollers 40 at the transfer speed according to the read scan magnification. Further, in step S66, the ADF controller 100 sets the transfer force between the rollers related to the control operation of transferring an original document while reading the original document.

After step S66, the ADF controller 100 determines whether the registration sensor 41 has been turned on to detect the leading edge of the original document in step S67.

When it is determined the registration sensor 41 has not been turned on to detect the leading edge of the original document, the result of step S67 is NO, and the ADF controller 100 repeats step S67 until the registration sensor 41 is turned on to detect the leading edge of the original document.

When it is determined that the registration sensor 41 has been turned on to detect the leading edge of the original document, the result of step S67 is YES, and the ADF controller 100 determines whether the discharge sensor 50 has been turned on to detect the leading edge of the original document in step S68.

When it is determined that the discharge sensor 50 has not been turned on to detect the leading edge of the original document, the result of step S68 is NO, and the ADF controller 100 determines whether the jam detection time has been over or not in step S69.

When it is determined that the jam detection time has not been over, the result of step S69 is NO, and the process goes back to step S68.

When it is determined that the jam detection time has been over, the result of step S69 is YES, and the ADF controller 100 determines a jam indicating that the leading edge of the original document has not reached the discharge sensor 50 has occurred and displays a message on the display panel 48 to inform the occurrence of the jam in step S70.

When it is determined that the discharge sensor 50 has been turned on to detect the leading edge of the original document, the result of step S68 is YES, the ADF controller 100 determines whether the registration sensor 41 has been turned off in step S71.

When it is determined that the registration sensor 41 has not been turned off, the result of step S71 is NO, and the ADF controller 100 determines whether the jam detection time has been over or not in step S72.

When it is determined that the jam detection time has not been over, the result of step S72 is NO, and the process goes back to step S71.

When it is determined that the jam detection time has been over, the result of step S72 is YES, and the ADF controller 100 determines a jam indicating that the original document has not completely passed the registration sensor 41 has occurred and displays a message on the display panel 48 to inform the occurrence of the jam in step S73.

When it is determined that the registration sensor 41 has been turned off, the result of step S71 is YES, and the ADF controller 100 determines whether the discharge sensor 50 has been turned off or not in step S74.

When the discharge sensor 50 has not been turned off, the result of step S74 is YES, and the ADF controller 100 determines whether the jam detection time has been over or not in step S75.

When it is determined that the jam detection time has not been over, the result of step S75 is NO, and the process goes back to step S74.

When it is determined that the jam detection time has been over, the result of step S75 is YES, and the ADF controller 100 determines a jam indicating that the original document is not completely discharged has occurred and displays a message on the display panel 48 to inform the occurrence of the jam in step S76.

When it is determined that the discharge sensor 50 has been turned off, the result of step S74 is YES, the ADF controller 100 transmits the discharge completion signal to the main body controller 111 in step S77, and completes the procedure to return to the start of the operation for a next original document.

In a double face mode, the ADF controller 100 turns on the switchback solenoid 105 before the leading edge of the original document that has passed through the scanning position 80 reaches the document discharging roller set 42 after reading the front face of the original document, so that the path switching member 44 can move to the position indicated by a chain double-dashed line shown in FIG. 2, and further drives the document switchback motor 104 to rotate in a normal direction.

With the above-described operations, the original document can be conveyed or transferred onto the switchback path 46a as indicated by arrow B in FIG. 2.

Then, the ADF controller 100 causes the path switching member 44 to move to the position indicated by a solid line shown in FIG. 2, and further drives the document switchback motor 104 to rotate in a reverse direction so that the original document can be conveyed to the reentry path 46b as indicated by arrow C in FIG. 2. Thus, the original document with the front face thereof having been read is transferred to the scanning position 80 again, so that the rear face of the original document can be read. Further, for aligning the page order, the original document, both the front and rear faces of which having been read, is transferred onto the switchback path 46a, reversed via the reentry path 46b, and discharged to the document discharge tray 43 as indicated by arrow A in FIG. 2 without being read at the scanning position 80. Accordingly, for the double face mode, the original document passes on the scanning position 80 for three times before being discharged.

Figure 13:
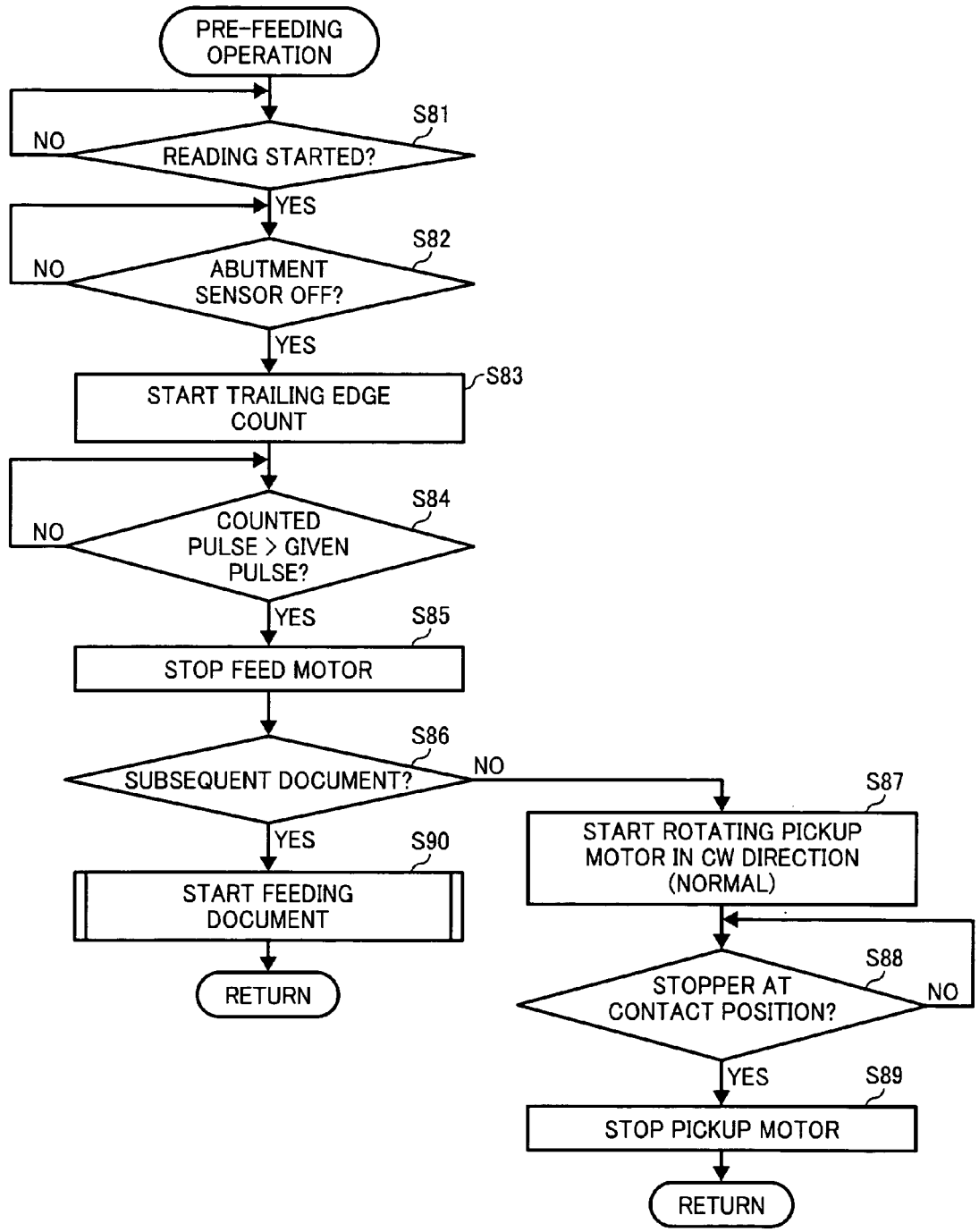
FIG. 13 is a flowchart of a pre-feeding operation of a sequential original document, according to an example embodiment of the present patent application.

Next, a pre-feeding operation in a single face mode is described, in reference to a flowchart shown in FIG. 13 is described.

In this example embodiment of the present invention, a preceding original document is referred to as a "foregoing original document D1", and a next original document following the preceding or first original document is referred to as a "subsequent original document D2."

In step S81 of the flowchart shown in FIG. 13, the ADF controller 100 receives the read start signal from the main body controller 111, and determines whether the reading of the foregoing original document D1 has been started. As previously described, the single face mode may be applied to a transfer or conveyance of at least one of a paper sheet and an electronic paper.

When it is determined that the reading of the foregoing original document D1 has not been started, the result of step S81 is NO, and the ADF controller 100 repeats step S81 until the reading of the foregoing original document D1 is started.

When it is determined that the reading of the foregoing original document D1 has been started, the result of step S81 is YES, the ADF controller 100 determines whether the abutment sensor 35 has been turned off in step S82.

When it is determined that the abutment sensor 35 has not been turned off, the result of step S82 is NO, the ADF controller 100 repeats step S82 until the abutment sensor 35 is turned off.

When it is determined that the abutment sensor 35 has been turned off, the result of step S82 is YES, the ADF controller 100 starts the trailing edge count for counting the number of drive pulses of the document feed motor 102 after the abutment sensor 35 has detected the trailing edge of the foregoing original document D1, in step S83.

After step S83, the ADF controller 100 determines whether the trailing edge count is greater than the reference number of pulses, in step S84.

The reference number of pulses is set to the number of drive pulses of the document feed motor 102, counting from when the abutment sensor 35 detected the trailing edge of the original document to when the original document passed the pair of pull-out rollers 36.

When it is determined that the trailing edge count is equal to or smaller than the reference number of pulses, the result of step S84 is NO, and the ADF controller 100 repeats step S84 until the trailing edge count becomes greater than the reference number of pulses.

When it is determined that the trailing edge count is greater than the reference number of pulses, the result of step S84 is YES, the ADF controller 100 stops the rotations of the document feed motor 102 rotating in the reverse direction in step S85, and determines whether the subsequent original document D2 is set on the document setting table 24, in step S86.

When it is determined that the second original document is set on the document setting table 24, the result of step S86 is YES, and the ADF controller 100 starts feeding the subsequent original document D2 in step S90, and completes the procedure to return to execute the procedure in the flowcharts shown in FIGS. 7 through 12, to the start of the operation for a subsequent original document.

When it is determined that the subsequent original document D2 is not set on the document setting table 24, the result of step S86 is NO, the ADF controller 100 drives the document pickup motor 101 to rotate in a clockwise direction, which is a normal direction, in step S87, and determines whether the document stopper 28 has moved to the position indicated by the chain double-dashed line in FIG. 2, in step S88.

When it is determined that the document stopper 28 has not moved to the contact position, the result of step S88 is NO, the ADF controller 100 repeats step S88 until the document stopper 28 moves to the contact position.

When it is determined that the document stopper 28 has moved to the contact position, the result of step S88 is YES, and the ADF controller 100 stops the document pickup motor 101, in step S89 and completes to return to the start of the transfer operation.

FIG. 14 is the document order table showing an order of the original documents placed or stacked on the document setting table 24. This document order table is used to update the order of the original documents, in step S29 to S31 in the flowchart of FIG. 9 and step S64 in FIG. 11, according to the order of feed of the original documents (e.g., the order of detection at the read inlet sensor 39) and the corresponding ID numbers.

In FIG. 14, the document order table includes the order of the original documents, the media type information (paper sheet or electronic paper), the identification information (ID numbers of electronic papers), and the memory information (whether electronic data of the original document is stored or not in the memory of the main body controller 111). The document order table is provided, for example, to a given area in the ADF controller 100 or the main body controller 111 so as to sort electronic data (image data of the paper sheet and the electronic data of the overall pages of the electronic paper) obtained by the first wireless reader 801 and the scanner 81 based on the order or a separated original document and the media type.

This document order table shows a current condition in transfer of the original documents. Specifically, the table shows that the fifth original document has been separately fed, that the second wireless reader 802 has determined the fifth original document to be a paper sheet as the result of its attempt, that the order of the original documents has been updated to be the same order as those placed on the document setting table 24 or as those transferred, and that the electronic data of an image scanned by the scanner 81 has not been stored in the memory.

As described above, the copier 21 according to an example embodiment of the present patent application may use the electronic paper 900 that stores unique identification information in association with electronic data by a given number of pages, and may transmit the unique identification information and the electronic data of the electronic papers 900 wirelessly, before sheet separation or sheet transfer, according to a signal sent from the first wireless reader 801. Accordingly, overall electronic data of the multiple electronic papers 900 can be read at one time in a batch, compared to a case in which image data is scanned sheet by sheet at the scanning position 80. Further, the electronic paper 900 may be transferred faster than the paper sheet.

According to the example embodiment of the present patent application, while the original document is being transferred, the ID number corresponding to the identification information of the electronic paper 900 may be obtained by the second wireless reader 802 disposed in the vicinity of the registration stop position located upstream from the scanning position 80 in the sheet travel direction. By so doing, the speed for optically reading the paper sheet can be surely controlled, the high-speed transfer of the electronic paper 900 may be accelerate, so as to reduce the transfer period.

According to the example embodiment of the present patent application, the electronic data, including the ID numbers, of the multiple electronic papers 900 placed on the document setting table 24 is read by the first wireless reader 801 at one time, only the ID number data having less data volume is read by the second wireless reader 802 after the sheet separation, and the original documents are determined and sorted to the original order on the document setting table 24 according to each ID number. Accordingly, the processing period can be shorter than a case in which the original document is conveyed sheet by sheet to determine and rearrange the document order.

According to the example embodiment of the present patent application, the transfer of the original document is prohibited until the first wireless reader 801 completes a batch reading of the electronic data of the multiple electronic papers 900. Accordingly, the overall electronic data of the multiple electronic papers 900 may be surely obtained.

According to the example embodiment of the present patent application, the data volume of the ID number provided to the electronic paper 900 is small, and therefore a reduction of the transfer speed of the electronic paper 900 or a stop of the electronic paper 900 is not required when the second wireless reader 802 disposed in the vicinity of the registration stop position reads each ID number sequentially during the transfer of the electronic paper 900. Accordingly, while suppressing the reduction of the transfer speed, the electronic data can be sorted and rearranged to the order originally placed in the document setting table 24 based on the ID number obtained by the second wireless reader 802 and the ID number obtained together with the electronic data by the first wireless reader 801.

According to the example embodiment of the present patent application, when the second wireless reader 802 disposed upstream from the scanning position 80 in the document travel direction cannot read the ID number, the original document is determined to be a paper sheet. Accordingly, an appropriate transfer control can be conducted based on the determination of the media type. For example, when the original document is a paper sheet, a low transfer speed suitable for the optical reading by the scanner 81 is set. By contrast, when the original document is an electronic paper, a high transfer speed suitable for the sheet discharging transfer is set. Thus, the transfer period of the original document can be controlled or reduced.

Further, when the original papers placed in the document setting table 24 are electronic papers 900 only, after the second wireless reader 802 determines the media type of the original document, the original document may be transferred at high speed appropriate to the sheet discharging transfer. Accordingly, the original document can be transferred faster.

When the electronic paper 900 is read during the transfer of the original document, the transfer speed of the original document through communication or via optical reading is conducted at low speed, so as to account for a volume of the electronic data.

According to the above-described example embodiment, the overall electronic data of the electronic paper 900 can be read through communication with the first wireless reader 801 while the original document 900 is placed on the document setting table 24 or remains unmoved. Accordingly, the above-described inconvenience related to the transfer speed and data volume may not occur.

Further, in order to perform a transfer control suitable for the electronic paper and the paper sheet, it may need that the media type of the original document is determined at an upstream side from the scanning position 80 and that the transfer control is switched between the electronic paper and the paper sheet.

According to the above-described example embodiment, the second wireless reader 802 may detect the conveyed original document and determine the media type of the original document at the registration stop position. Accordingly, the transfer control suitable for the electronic paper and for the paper sheet can be performed.

According to the above-described example embodiment, when both the paper sheet and the electronic paper 900 are placed in the document setting table 24, the second wireless reader 802 may read the media type of the original documents sequentially, and the detection result obtained by the second wireless reader 802 can sort and rearrange the order of the original documents as placed on the document setting table 24. Further, by matching the ID number read by the first wireless reader 801 and the ID number read by the second wireless reader 802, the electronic data corresponding to the ID number of the electronic paper 900 read by the second wireless reader 802 can be specified from the electronic data read by the first wireless reader 801. That is, the electronic data of the image formed on the paper sheet and the electronic data of the electronic paper 900 can be sorted to the order of the original documents originally placed on the document setting table 24, according to the progress of transfer the original documents.

In a case in which only the electronic papers 900 are placed in the document setting table 24, after the media type is determined by the second wireless reader 802, the electronic data of the electronic papers 900 may be sorted and rearranged in the original order set in the document setting table 24. Accordingly, a period required for rearrangement of the original documents can be significantly reduced.

In an example embodiment of the present patent application, when reading units or sensors having functions different from each other (for example, the first wireless reader 801 and the scanner 81) obtain respective electronic data of original documents of different media types at different timings, the electronic data of the paper sheet and the electronic data of the electronic paper may be sorted and rearranged in the order of the original documents originally placed in the document setting table 24, and stored in a common format in the main body controller 111 that serves as a sorting unit and a storage unit, for example. Accordingly, the processes of output, transmission, manufacturing, etc. can be conducted easily.

The above-described example embodiment uses ID numbers such as serial numbers as identification information, but the identification information is not limited thereto. For example, the present patent application can also use an image as identification information to achieve the same effect as described above. Further, not only electronic data but also visible information, for example, displayed or printed label can be used as identification information.

Further in the above-described example embodiment, the electronic paper 900 is read while placed on the document setting table 24. However, the present patent application can also achieve the same effect by reading the electronic paper 900 either before being placed on the document setting table 24 or by an external device outside the copier 21.

In the above-described example embodiment, the first wireless reader 801 and the second wireless reader 802 communicate each other via radio waves. However, the present patent application can also achieve the same effect by using magnetic data communications or infrared data communications. Further, in consideration of communication speed and data volume, communication can be made via metal contacts.

In the above-described example embodiment, the identification information and the overall electronic data of every page of the electronic paper 900 are corresponded or matched directly. However, the present patent application can also achieve the same effect by employing identification information different from the above-described identification information so as to store the identification information provided to the electronic data of the electronic paper 900 or by providing a document order table, which is different from the document order table of FIG. 14, for specifying a relation between the identification information of the electronic paper and the different identification information.

In the above-described example embodiment, the second wireless reader 802 is disposed in the vicinity of the registration stop position. However, the present patent application can also achieve the same effect by disposing the second wireless reader 802 at an upstream side from the registration stop position (for example, in the vicinity of the separation sensor 51) in the document transfer direction or at a downstream side from the registration stop position (for example, in the vicinity of the discharge sensor 50) in the document transfer direction. When the second wireless reader 802 is disposed in the vicinity of the discharge sensor 50, all the original documents may be optically read by the scanner 81, then the image data of the electronic paper(s) 900 may be cancelled according to the media type of the original documents, and the electronic data read by the first wireless reader 801 may be employed.

Further, in the above-described example embodiment, the second wireless reader 802 determines whether the media type of the transferred original document and obtains the ID number of the transferred original document. However, the present patent application can also apply to a media detector instead of the second wireless reader 802.

Figure 15:
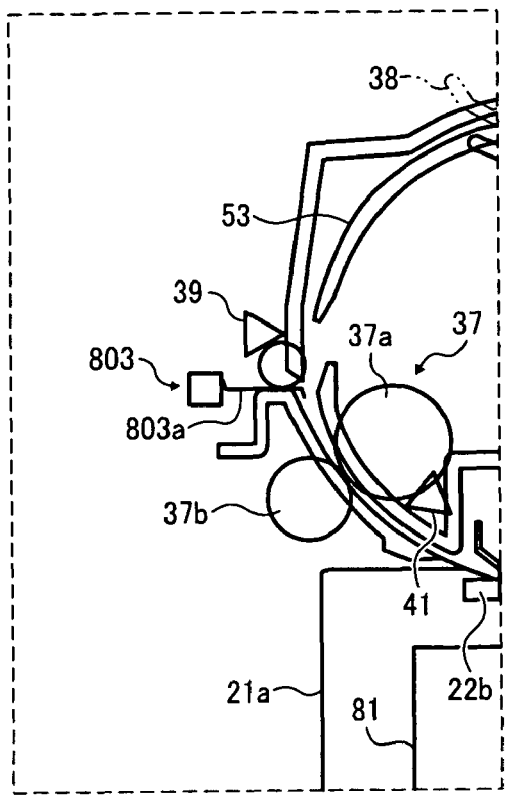
FIG. 15 is an enlarged view of the image reading system according to an example embodiment of the present patent application.
Figure 16:
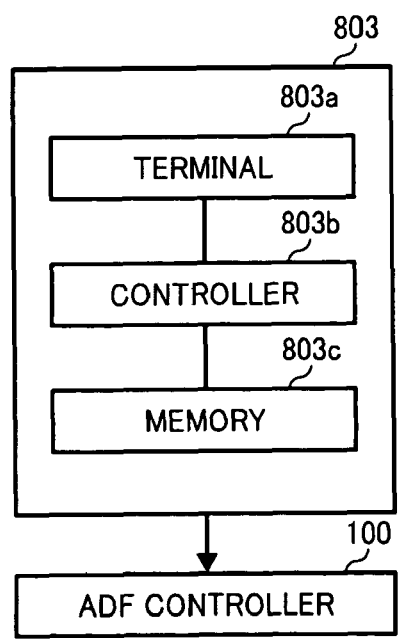
FIG. 16 is a block diagram of a media type detector according to an example embodiment of the present patent application.
Figure 17:
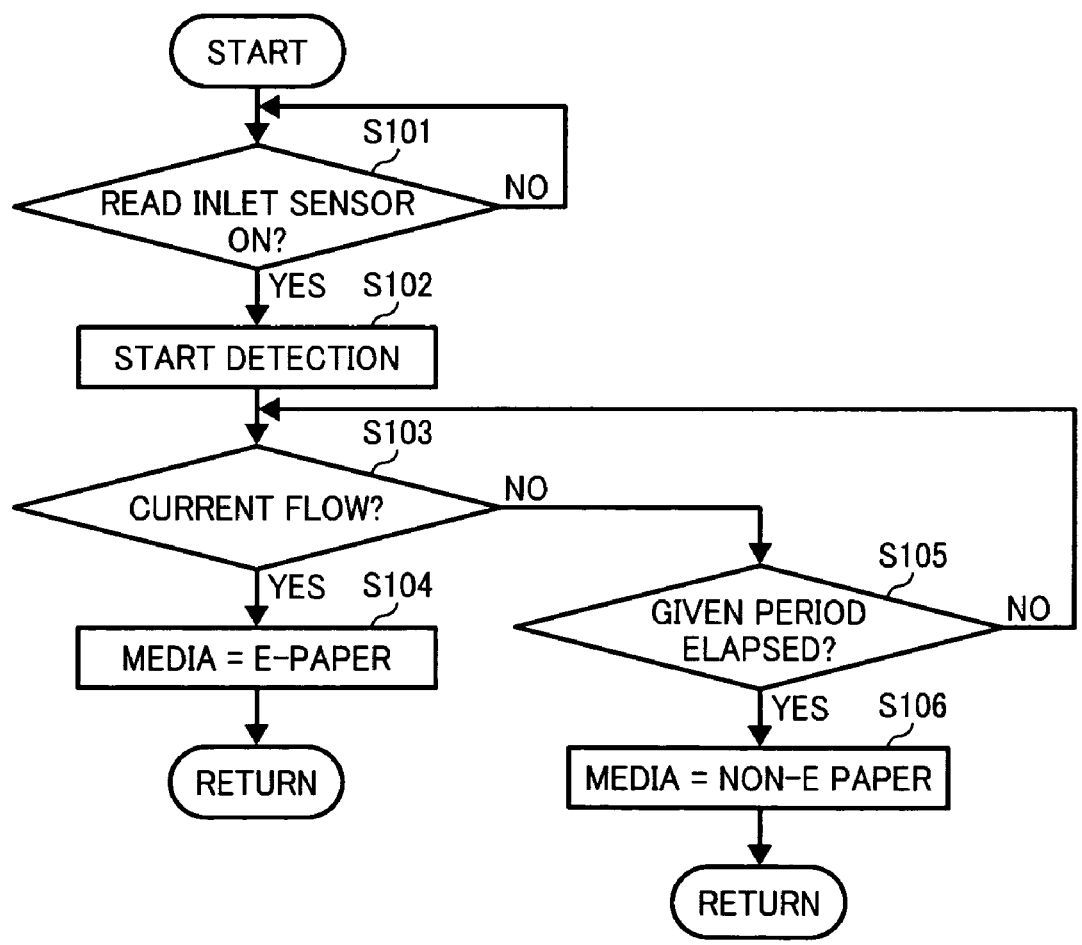
FIG. 17 is a flowchart of a media type detection process executed in the image reading system of FIG. 1, according to an example embodiment of the present patent application.

Referring to FIGS. 15 through 17, a description is given of an electronic media detection unit 803 according to an example embodiment of the present patent application.

FIG. 15 illustrates an enlarged view of the ADF 23, focusing on the electronic media detection unit 803. FIG. 16 is a block diagram of the electronic media detection unit 803. FIG. 17 is a flowchart of a media type detection process performed by the electronic media detection unit 803.

The electronic media detection unit 803 serves as a secondary sensor, and is disposed at an immediately downstream side from the read inlet sensor 39, as shown in FIG. 15.

The electronic media detection unit 803 detects the original document during the transfer of the original document to determine a media type or determine whether the conveyed original document is a paper sheet or an electronic paper. Specifically, the electronic media detection unit 803 contacts the original document conveyed thereto, and determines whether the original document is a paper sheet or an electronic paper. When the original document is determined to be an electronic paper 900 according to the result of determination by the electronic media detection unit 803, the original document is conveyed to the scanning position 80 of the scanner 81. The scanner 81 optically reads an ID number indicated or displayed on the electronic paper 900, matches the read ID number of the electronic paper 900 with the ID number read by the first wireless reader 801, and updates or rearranges the page number of the original document. Therefore, the electronic media detection unit 803 can also obtain both image data of the paper sheet and image data of the electronic paper.

In addition, the electronic media detection unit 803 does not communicate with the first wireless reader 801 via radio waves, but determines the media type of the original document by contacting the terminal 803a thereof with the electronic paper 900 to flow electric current. Therefore a low cost configuration can be achieved, compared to the configuration including the first wireless reader 801 and the second wireless reader 802.

In the above-described example embodiment, a conductive contact terminal 911 that includes, for example, a metal plated member is arranged on a peripheral part of the display surface of the electronic paper 900.

As shown in FIG. 16, the electronic media detection unit 803 includes a terminal 803a, a controller 803b, and a memory 803c. The electronic media detection unit 803 further includes a current flow detection circuit, not shown.

The terminal 803a is designed to contact the original document conveyed to the read inlet sensor 39. The current flow detection circuit detects whether electric current flows between the conductive contact terminal 911 of the electronic paper 900 and the terminal 803a of the electronic media detection unit 803.

As shown in FIG. 17, the ADF controller 100 determines whether the read inlet sensor 39 has been turned on, in step S101.

When it is determined that the read inlet sensor 39 has not been turned on, the result of step S101 is NO, and the ADF controller 100 repeats step S101 until the read inlet sensor 39 is turned on.

When it is determined that the read inlet sensor 39 has been turned on, the result of step S101 is YES, and the ADF controller 100 starts detection to cause the terminal 803a of the electronic media detection unit 803 to contact the conductive contact terminal 911, in step S102, and determines whether the electric current flows between the conductive contact terminal 911 of the electronic paper 900 and the terminal 803a of the electronic media detection unit 803, in step S103.

When it is determined that the electric current flows between the conductive contact terminal 911 and the terminal 803a, the result of step S103 is YES, and the ADF controller 100 determines that the original document detected by the electronic media detection unit 803 is the electronic paper 900, in step S104, and returns the process.

When it is determined that the electric current does not flow between the conductive contact terminal 911 and the terminal 803a, the result of step S103 is NO, and the ADF controller 100 continues the detection for a given period of time. Then, the ADF controller 100 determines whether the given period of time to detect the media type of the original document has passed, in step S105.

When it is determined that the given period of time has not passed, the result of step S105 is NO, the process goes back to step S103.

When it is determined that the given period of time has passed, the result of step S105 is YES, the ADF controller 100 determines that the original document detected by electronic media detection unit 803 is the paper sheet, in step S106, and returns the process.

Further, when the original document is determined to be the electronic paper 900 based on the result detected by the electronic media detection unit 803, the ADF controller 100 may cause the scanner 81 to optically read the display surface of the electronic paper 900, detect image data corresponding to the third display region 910, and match the extracted image data such as the ID number data and the ID number data obtained by the first wireless reader 801. When the ID numbers are matched, the ADF controller 100 may add the matched ID number to the document order table shown in FIG. 14 to update and rearrange the order of the original documents. The electronic data of every page of the electronic paper 900 has already been read and stored by the first wireless reader 801, and therefore the electronic data corresponding to the specific page(s) of the electronic paper 900, which has been read optically, is cancelled or deleted.

Further, the first wireless reader 801 reads the electronic papers 900 all together at one time before the sheet separation or sheet transfer, then the second wireless reader 802 determines the media type of the original document and rearranges the document order during the sheet transfer, and the scanner 81 optically reads the image data of the paper sheet. Therefore, the original documents can be effectively read according to the media type and the order of the electronic data of the original documents can be sorted and rearranged to the order of the original documents placed in the document setting table 24.

The above-described example embodiments are illustrative, and numerous additional modifications and variations are possible in light of the above teachings. For example, elements and/or features of different illustrative and example embodiments herein may be combined with each other and/or substituted for each other within the scope of this disclosure and appended claims. It is therefore to be understood that within the scope of the appended claims, the disclosure of this patent specification may be practiced otherwise than as specifically described herein.

Example embodiments being thus described, it will be obvious that the same may be varied in many ways. Such variations are not to be regarded as a departure from the spirit and scope of the present patent application, and all such modifications as would be obvious to one skilled in the art are intended to be included within the scope of the following claims.

What is claimed is:

1. An image reading system, comprising:
a document feed tray to contain original documents including either or both of a non-electronic recording medium and an electronic paper,
the electronic paper including,
a first memory to store electronic data of the electronic paper, the electronic data including electronic image data and unique identification information; and
a first communication element to communicate with an external unit;
a primary sensor comprising a second communication element to communicate with the first communication element of multiple electronic papers and a second memory to store the electronic data of the multiple electronic papers, the primary sensor configured to read the electronic data including the electronic image data and the unique identification information from the first memory of each of the multiple electronic papers included in the original documents before each of the multiple electronic papers is transferred from the document feed tray and configured to store the read electronic data including the read electronic image data and the read unique identification information in the second memory;
a secondary sensor comprising a third communication element to individually communicate with the first communication element of each of the multiple electronic papers, the secondary sensor configured to individually detect the original documents and determine whether each of the original documents is the non-electronic recording medium or the electronic paper during transfer in an original order as set in the document feed tray between the document feed tray and a scanning position;
a transfer unit to transfer the original documents to the scanning position disposed downstream from the document feed tray at a speed based on a determination result obtained by the secondary sensor, wherein when the secondary sensor determines that the original document is the non-electronic recording medium, the transfer unit transfers the non-electronic recording medium at a first speed, wherein when the secondary sensor determines that the original document is the electronic paper, the transfer unit transfers the electronic paper at a second speed, wherein the second speed is higher than the first speed; and an optical image reader to optically read an image formed on each non-electronic recording medium of the original documents at the scanning position to produce electronic data of the image formed on each non-electronic recording medium.

2. The image reading system according to claim 1, further comprising:

a sorting unit to sort and rearrange the electronic data of the electronic paper read by the primary sensor in the original order, wherein, when the primary sensor reads the electronic data of the electronic paper, including the electronic image data and unique identification information, and the secondary sensor detects the unique identification information stored in the first memory of the electronic paper to determine that the detected original document is the electronic paper, the sorting unit sorts the electronic data of the electronic paper in the original order according to the unique identification information read by the primary sensor and the unique identification information read in the original order by the secondary sensor.

3. The image reading system according to claim 2, wherein when the secondary sensor obtains no data of the unique identification information and determines that the detected original document is the non-electronic recording medium, the sorting unit sorts electronic data of the non-electronic recording medium obtained by the optical image reader and the electronic data of the electronic paper obtained by the primary sensor in the original order, according to each media type of the original documents determined in the original order by the secondary sensor.

4. The image reading system according to claim 1, wherein the secondary sensor determines each media type of the original documents while the original documents travel between the document feed tray and the scanning position.

5. The image reading system according to claim 1, further comprising:

a document discharge tray disposed downstream from the scanning position in a travel direction of the original documents, the document discharge tray configured to hold the original documents read at the scanning position.

6. The image reading system according to claim 1, further comprising:

a storage unit to store the electronic data of the non-electronic recording medium and the electronic data of the electronic paper in a common format.

7. The image reading system of claim 1, wherein wherein when the document feed tray contains multiple electronic papers, the primary sensor is configured to read and store the electronic data including the electronic image data from each of the multiple electronic papers before the multiple electronic papers are transferred from the document feed tray.

8. An image reading system, comprising:

a document feed tray to contain original documents including either or both of a non-electronic recording medium and an electronic paper, the electronic paper including,
  a first memory to store electronic data of the electronic paper, the electronic data including electronic image data and unique identification information; and
  a first communication element to communicate with an external unit;

a primary sensor comprising a second communication element to communicate with the first communication element of the electronic paper and a second memory to store the electronic data of the electronic paper, the primary sensor configured to read the electronic data including the electronic image data and the unique identification information from the first memory of each electronic paper included in the original documents before each electronic paper is transferred from the document feed tray and configured to store the read electronic data including the read electronic image data and the unique identification information in the second memory;

a secondary sensor to detect the original documents and determine whether each of the original documents is the non-electronic recording medium or the electronic paper during transfer in an original order as set in the document feed tray between the document feed tray and a scanning position;

a transfer unit to transfer the original documents to the scanning position disposed downstream from the document feed tray at a speed based on a determination result obtained by the secondary sensor, wherein when the secondary sensor determines that the original document is the non-electronic recording medium, the transfer unit transfers the non-electronic recording medium at a first speed, wherein when the secondary sensor determines that the original document is the electronic paper, the transfer unit transfers the electronic paper at a second speed, wherein the second speed is higher than the first speed; and an optical image reader to optically read an image of each of the original documents at the scanning position to obtain electronic data of the image formed on each of the original documents.

9. The image reading system according to claim 8, further comprising:

a sorting unit to sort the electronic data of the electronic paper read by the primary sensor in the original order, wherein, when the primary sensor reads the electronic data of the electronic paper, including the electronic image data and unique identification information, and the secondary sensor determines that the detected original document is the electronic paper, the optical image reader reads an image of the unique identification information provided to each electronic paper to obtain the electronic data of the image, and the sorting unit sorts the electronic data of the electronic paper in the original order according to the electronic data of the unique identification information read by the primary sensor and the electronic data of the unique identification information read by the optical image reader.

10. The image reading system of claim 8, wherein wherein when the document feed tray contains multiple electronic papers, the primary sensor is configured to read and store the electronic data including the electronic image data from each of the multiple electronic papers before the multiple electronic papers are transferred from the document feed tray.

11. An image forming apparatus, comprising:

an image reading system comprising:
  a document feed tray to contain original documents including either or both of a non-electronic recording medium and an electronic paper, the electronic paper including:
- a first memory to store electronic data of the electronic paper, the electronic data including electronic image data; and
- a first communication element to communicate with an external unit;
- a primary sensor comprising a second communication element to communicate with the first communication element of the electronic paper and a second memory to store the electronic data of the electronic paper, the primary sensor configured to read the electronic data including the electronic image data from the first memory of each electronic paper included in the original documents before each electronic paper is transferred from the document feed tray and configured to store the read electronic data including the read electronic image data in the second memory;
- a secondary sensor to detect the original documents and determine whether each of the original documents is the non-electronic recording medium or the electronic paper during transfer in an original order as set in the document feed tray between the document feed tray and a scanning position;
- a transfer unit to transfer the original documents to the scanning position disposed at a downstream side from the document feed tray at a speed based on a determination result obtained by the secondary sensor, wherein when the secondary sensor determines that the original document is the non-electronic recording medium, the transfer unit transfers the non-electronic recording medium at a first speed, wherein when the secondary sensor determines that the original document is the electronic paper, the transfer unit transfers the electronic paper at a second speed, wherein the second speed is higher than the first speed; and
- an optical image reader to optically read an image formed on each non-electronic recording medium of the original documents at the scanning position to produce electronic data of the image formed on each non-electronic recording medium; and
- an image forming mechanism to print on a recording medium an image according to the electronic data obtained either by the primary sensor or at the scanning position.

12. The image forming apparatus according to claim 11, wherein the secondary sensor including a third communication element to communicate with the first communication element of the electronic paper.

13. The image forming apparatus according to claim 12, further comprising:
- a sorting unit to sort and rearrange the electronic data of the electronic paper read by the primary sensor in the original order,
- wherein, when the primary sensor reads the electronic data of the electronic paper, including the electronic image data and unique identification information, and the secondary sensor detects the unique identification information stored in the first memory of the electronic paper to determine that the detected original document is the electronic paper, the sorting unit sorts the electronic data of the electronic paper in the original order according to the unique identification information read by the primary sensor and the unique identification information read in the original order by the secondary sensor.

14. The image forming apparatus according to claim 13, wherein, when the secondary sensor obtains no data of the unique identification information and determines that the detected original document is the non-electronic recording medium, the sorting unit sorts electronic data of the non-electronic recording medium obtained by the optical image reader and the electronic data of the electronic paper obtained by the primary sensor in the original order, according to each media type of the original documents determined in the original order by the secondary sensor.

15. The image forming apparatus according to claim 12, wherein the secondary sensor determines each media type of the original documents while the original documents travel between the document feed tray and the scanning position.

16. The image forming apparatus according to claim 12, wherein the image reading system further comprises a document discharge tray disposed downstream from the scanning position in a travel direction of the original documents,
- the document discharge tray to hold the original documents read at the scanning position,
- when the secondary sensor determines that the original document is the non-electronic recording medium, the transfer unit transfers the non-electronic recording medium to the document discharge tray at a first speed,
- when the secondary sensor determines that the original document is the electronic paper, the transfer unit transfers the electronic paper to the document discharge tray at a second speed, the second speed being higher than the first speed.

17. The image forming apparatus according to claim 12, wherein the image reading mechanism further comprises a storage unit to store the electronic data of the non-electronic recording medium and the electronic data of the electronic paper in a common format.

18. The image forming apparatus according to claim 11, the image reading system further comprises a sorting unit to sort the electronic data of the electronic paper read by the primary sensor in the original order,
- wherein when the primary sensor reads the electronic data of the electronic paper, including the electronic image data and unique identification information, and the secondary sensor determines that the detected original document is the electronic paper, the optical image reader reads an image of the unique identification information provided to each electronic paper to obtain the electronic data of the image and the sorting unit sorts the electronic data of the electronic paper in the original order according to the electronic data of the unique identification information read by the primary sensor and the electronic data of the unique identification information read by the optical image reader.

19. The image forming apparatus of claim 11, wherein
wherein when the document feed tray contains multiple electronic papers, the primary sensor is configured to read and store the electronic data including the electronic image data from each of the multiple electronic papers before the multiple electronic papers are transferred from the document feed tray.

20. An image reading system, comprising:
- a document feed tray to contain original documents including either or both of a non-electronic recording medium and an electronic paper;
- the electronic paper including,
  - a first memory to store electronic data of the electronic paper, the electronic data including electronic image data and unique identification information;
  - a first communication element to communicate with an external unit;
- a primary sensor comprising a second communication element to communicate with the first communication element of multiple electronic papers and a second memory to store the electronic data of the multiple electronic papers, the primary sensor configured to read the electronic data including the electronic image data and the unique identification information from the first memory of each of the multiple electronic papers included in the original documents before any of the original documents are transferred from the document feed tray and configured to store the read electronic data including the read electronic image data and the read unique identification information in the second memory;

a secondary sensor comprising a third communication element to individually communicate with the first communication element of each of the multiple electronic papers, the secondary sensor configured to detect the original documents and determine whether each of the original documents is the non-electronic recording medium or the electronic paper during transfer in an original order as set in the document feed tray between the document feed tray and a scanning position, the secondary sensor configured to detect only the unique identification information from the first memory of each of the multiple electronic papers;

a transfer unit to transfer the original documents to the scanning position disposed downstream from the document feed tray at a speed based on a determination result obtained by the secondary sensor, wherein when the secondary sensor determines that the original document is the non-electronic recording medium, the transfer unit transfers the non-electronic recording medium at a first speed, wherein when the secondary sensor determines that the original document is the electronic paper, the transfer unit transfers the electronic paper at a second speed, and wherein the second speed is higher than the first speed, wherein the transfer unit transfers both the non-electronic recording medium and the electronic paper along a single conveyance path between the document feed tray and a discharge tray;

an optical image reader to optically read an image formed on each non-electronic recording medium of the original documents at the scanning position to produce electronic data of the image formed on each non-electronic recording medium;

a storage unit to store the electronic data of the non-electronic recording medium and the electronic data of the electronic paper in a common format; and a sorting unit to sort and rearrange the electronic data of the electronic paper read by the primary sensor in the original order, wherein, when the primary sensor reads the electronic data of the multiple electronic papers, including the electronic image data and unique identification information, the primary sensor stores the electronic data in the storage unit, and when the secondary sensor detects the unique identification information stored in the first memory of the detected original document to determine that the detected original document is the electronic paper, the sorting unit sorts the electronic data of the electronic paper in the original order according to the unique identification information read by the secondary sensor.

* * * * *